(12) United States Patent
Mantha et al.

(10) Patent No.: US 10,138,060 B1
(45) Date of Patent: Nov. 27, 2018

(54) MODULAR, MULTI-FUNCTION ROBOTIC POSITIONING SYSTEM

(71) Applicant: Amazon Technologies, Inc., Seattle, WA (US)

(72) Inventors: Srikanth Mantha, Seattle, WA (US); John Elias Darrow, Shoreline, WA (US); Darren Ernest Canavor, Redmond, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/189,239

(22) Filed: Jun. 22, 2016

(51) Int. Cl.
  B65G 1/137 (2006.01)
  B25J 18/02 (2006.01)
  B65G 1/04 (2006.01)
  G06Q 10/08 (2012.01)
  B25J 5/02 (2006.01)
  G05B 15/02 (2006.01)

(52) U.S. Cl.
  CPC ............... *B65G 1/137* (2013.01); *B25J 5/02* (2013.01); *B25J 18/025* (2013.01); *B65G 1/0485* (2013.01); *B65G 1/0492* (2013.01); *G05B 15/02* (2013.01); *G06Q 10/08* (2013.01); *G05B 2219/45083* (2013.01)

(58) Field of Classification Search
  CPC ................................ B25J 18/025; B65G 1/137
  See application file for complete search history.

(56) References Cited

U.S. PATENT DOCUMENTS

| | | | | |
|---|---|---|---|---|
| 6,535,790 B2 * | 3/2003 | Nakano | ................ | B65G 1/0435 235/385 |
| 6,564,120 B1 * | 5/2003 | Richard | .................... | G06F 7/36 414/277 |
| 7,826,919 B2 * | 11/2010 | D'Andrea | ............... | B66F 9/063 700/214 |
| 7,953,514 B2 * | 5/2011 | Kim | ..................... | B65G 1/0421 700/214 |
| 8,403,614 B2 * | 3/2013 | Bastian, II | ............. | B65G 61/00 414/282 |
| 8,425,173 B2 * | 4/2013 | Lert | ........................ | B65G 1/045 414/280 |
| 8,571,700 B2 * | 10/2013 | Keller | .................... | B25J 9/1687 700/213 |
| 8,888,434 B2 * | 11/2014 | Rebstock | .......... | H01L 21/67769 414/217 |

(Continued)

*Primary Examiner* — Thomas Randazzo
(74) *Attorney, Agent, or Firm* — Lee & Hayes, PC; Charles L. Warner

(57) ABSTRACT

A system to select and reposition inventory items on one or more shelving units is disclosed. The system can include a robotic positioning system (RPS) to move inventory items on a shelf to the front of the shelf, or off the shelf, to facilitate selection, delivery, and restocking of the inventory item. The RPS can include a movement system to enable it to position itself behind a particular inventory item on a shelf. The RPS can also include a positioner to enable the RPS to move the inventory item backward and forward on the shelf. The RPS can be mounted on a free-standing frame to enable movement in two axes and repositioning of inventory items in a third axis. The RPS can also be centrally mounted in a shelving unit and can move vertically and rotate about a single axis to reposition inventory items radially.

21 Claims, 26 Drawing Sheets

(56) References Cited

U.S. PATENT DOCUMENTS

| | | | |
|---|---|---|---|
| 8,956,099 B2* | 2/2015 | Olszak | B66F 9/07 |
| | | | 414/277 |
| 9,120,622 B1* | 9/2015 | Elazary | B65G 1/1373 |
| 9,327,397 B1* | 5/2016 | Williams | B25J 3/00 |
| 9,519,882 B2* | 12/2016 | Galluzzo | B25J 5/007 |
| 9,563,194 B2* | 2/2017 | Stiernagle | G05B 19/102 |
| 2004/0191032 A1* | 9/2004 | Foulke | B65G 1/04 |
| | | | 414/280 |
| 2009/0224040 A1* | 9/2009 | Kushida | G06Q 10/08 |
| | | | 235/385 |
| 2014/0060770 A1* | 3/2014 | Blumenau | B22D 33/00 |
| | | | 164/154.1 |
| 2015/0081089 A1* | 3/2015 | Kapust | B65G 1/1373 |
| | | | 700/218 |
| 2016/0325933 A1* | 11/2016 | Stiernagle | B65G 1/10 |
| 2017/0088354 A1* | 3/2017 | Sullivan | G06Q 10/08 |

* cited by examiner

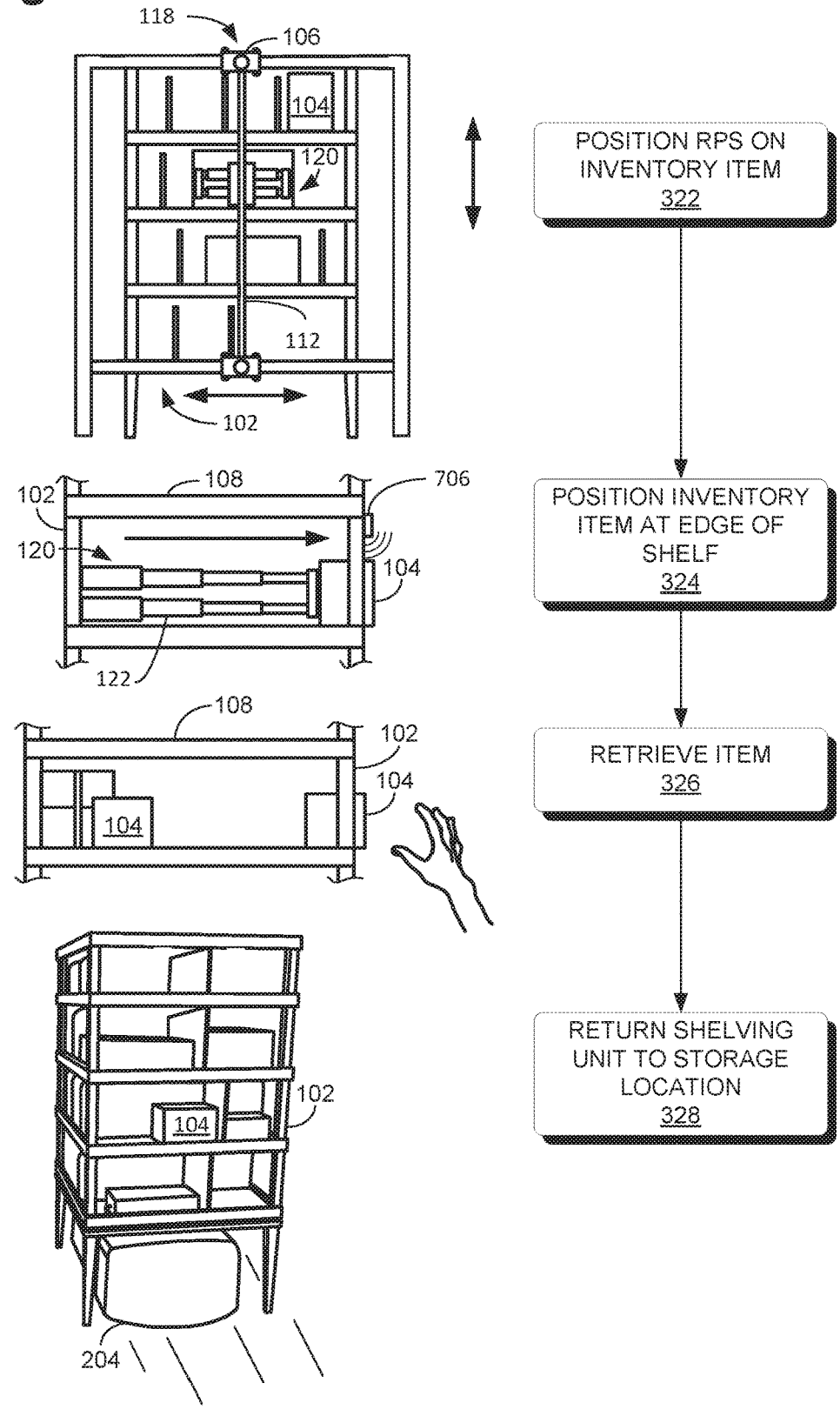

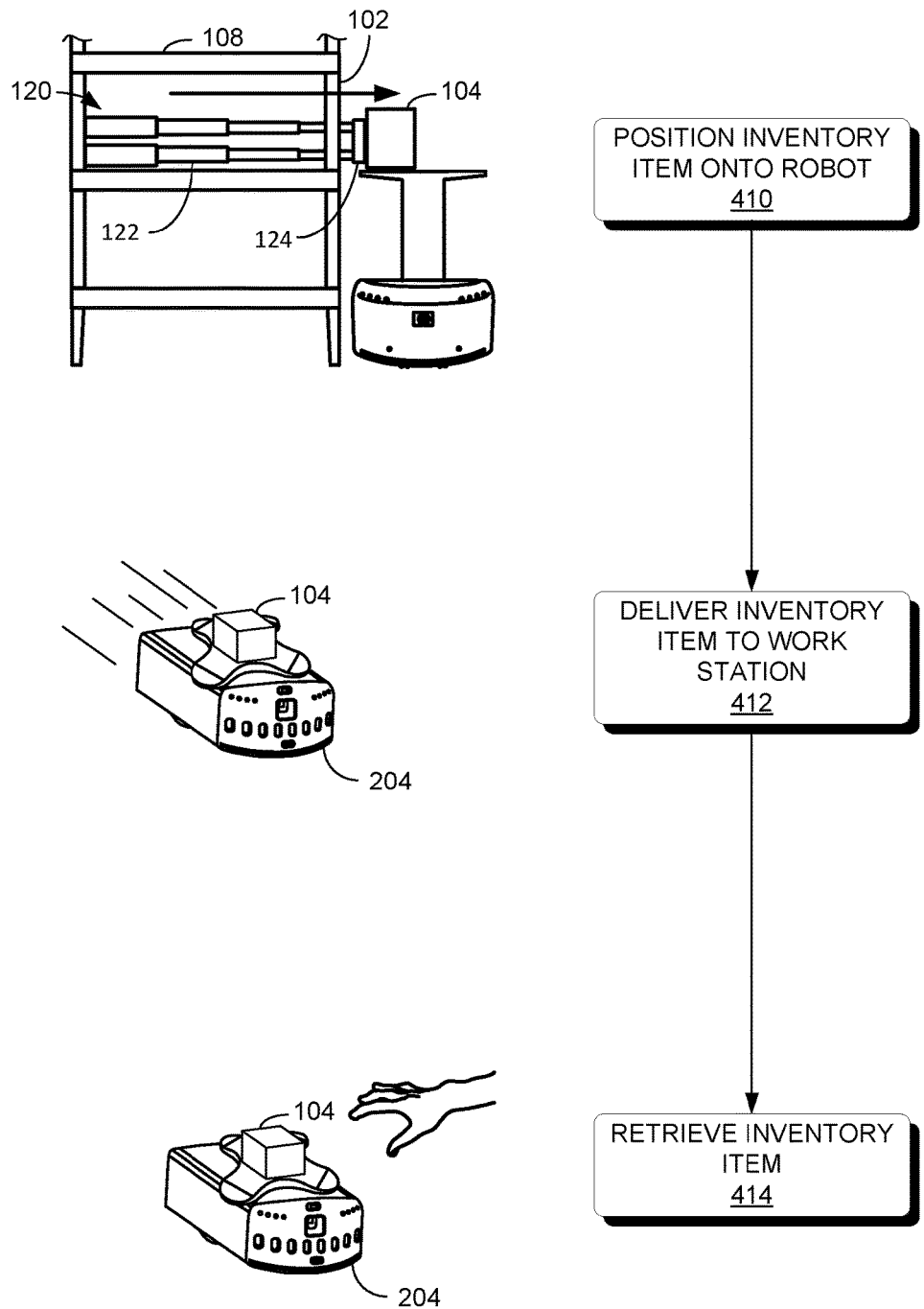

To Fig. 8B

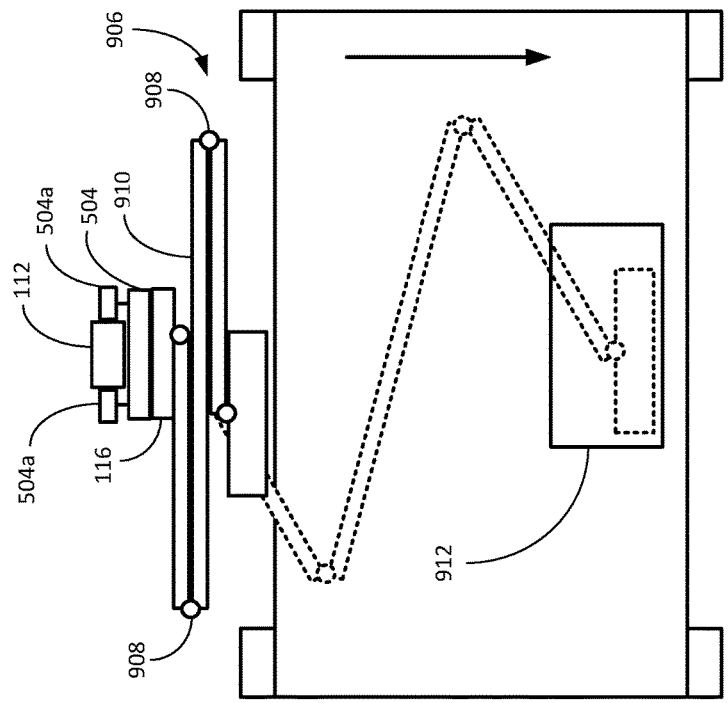
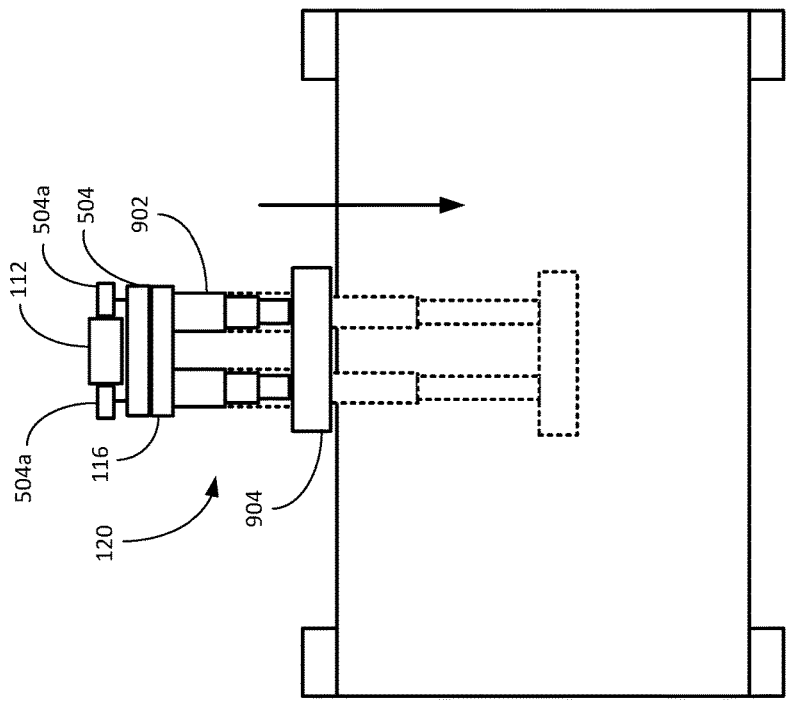
Fig. 9B
Fig. 9A

US 10,138,060 B1

MODULAR, MULTI-FUNCTION ROBOTIC POSITIONING SYSTEM

BACKGROUND

Modern inventory systems, such as those in mail order warehouses, supply chain distribution centers, airport luggage systems, and custom-order manufacturing facilities, include a number of complex systems, including robots, automated shelving systems, radio frequency identification (RFID), and automated scheduling and routing equipment. Some systems, for example, comprise robots that travel to shelving systems, retrieve them, and return the shelving systems to a central location for additional processing.

Automated warehouses exist that use robots, for example, to move shelves from a storage location in the warehouse to a shipping location (e.g., for inventory items to be boxed and shipped). These shelving systems can be densely stocked, tall, and otherwise cumbersome. This can make retrieval and identification of products difficult. In addition, transporting the shelves for processing, as opposed to retrieving a single item from the shelf, may not be the most efficient way to retrieve stock from the warehouse.

BRIEF DESCRIPTION OF THE FIGURES

FIGS. 3C and 3D are flowcharts depicting the RPS located at a work station and positioning an inventory item at the work station, in accordance with some examples of the present disclosure.

FIGS. 4A and 4B are flowcharts depicting the RPS transferring the inventory item to the robot for the robot to deliver the inventory item to a work station, in accordance with some examples of the present disclosure.

FIGS. 9A and 9B depict a telescoping and scissoring extender for an end effector, respectively, in accordance with some examples of the present disclosure.

DETAILED DESCRIPTION

Examples of the present disclosure relate generally to automated warehouses, and specifically to a modular inventory handling system for increasing the functionality of robots and shelving components in the warehouse. The shelving components can comprise bases and shelving units. The shelving units can also comprise one or more types of automated pushers, arms, or other mechanisms to facilitate removal of items from the shelves. In some examples, the robots can comprise a lifting mechanism, basket, or other means to receive items directly from the shelving unit. In some examples, various electronic components can be installed on the shelving unit and/or the robot to provide the shelving unit and/or robot with additional functionality.

A problem with conventional warehouse shelving is that the shelving can be very tall and very deep. As a result, items, especially smaller items, can be moved to the back of the shelves where they are difficult to see and/or reach. This can create issues when workers blindly reach in to locate the items, for example, because it may take extra time to locate an item and grasp the item. In addition, items can be hard to see and identify when recessed on deep shelves. In addition, workers may be unable to reach higher shelves and may resort to climbing on the shelves. Workers may also use ladders, boxes, or other means to be able to reach higher shelves, which can be time consuming.

Figure 1:
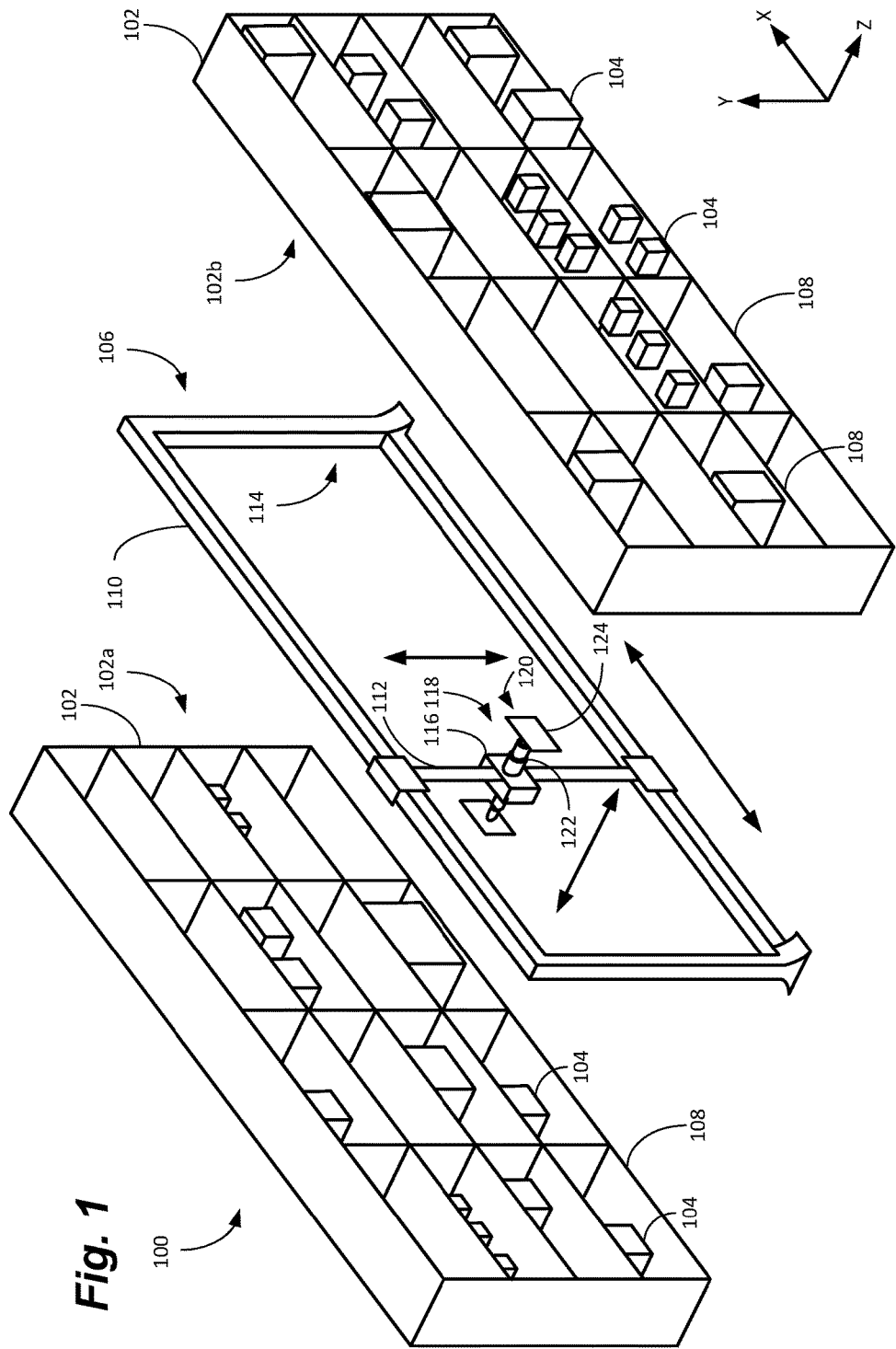
FIG. 1 depicts an isometric view of a robotic positioning system (RPS), in accordance with some examples of the present disclosure.

To this end, as shown in FIG. 1 in an exploded view, examples of the present disclosure can comprise various automatic or robotic positioning devices to enable items to be more easily identified and/or removed from stock. The system 100 can comprise a plurality of shelving units 102 for storing a variety of inventory items 104. The system 100 can also comprise a robotic positioning system (RPS) 106 disposed proximate the shelving units 102. The RPS 106 can locate the current position of an inventory item 104, position itself behind the inventory item 104, and then reposition the inventory item 104, as necessary.

In some examples, the RPS 106 can reposition the inventory item 104 to the edge of the shelf 108 of the shelving unit 102. This can enable a worker, for example, or a robotic picking machine to more easily retrieve the inventory item 104. When placed at the edge of the shelf 108, for example, a worker can determine the best way to grasp the inventory item 104 to avoid any sharp edges, points, or fragile parts. In this manner, the worker can avoid damaging the inventory item 104, among other things. In addition, placing the inventory item 104 close to the edge of the shelf 108 can enable the worker to more easily identify the inventory item 104—i.e., both because it is easier to see and because it is closer to the edge of the shelf 108 than the remaining inventory items 104.

In other examples, the RPS 106 can push the inventory item 104 completely off the shelf 108. This can enable the RPS 106 to push the inventory item 104 onto a waiting cart or robot, for example, for shipping or other handling. In this manner, the worker does not have to lift, or even touch, the inventory item 104. In some examples, the inventory item 104 can be delivered to an automated shipping system for further processing.

The RPS 106 can move horizontally and vertically with respect to one or more shelving units 102. In some examples, as shown, the RPS 106 can comprise a horizontal track 110 to enable the RPS 106 to move back and forth between the shelving units 102 and a vertical track 112 to move up and down between the shelves 108. In some examples, the tracks 110, 112 can comprise a free-standing frame 114 to enable the shelving units 102 to be moved independently of the RPS 106. In other examples, the tracks 110, 112 can be attached to the shelving units 102 or can use the frames of the shelving units 102 as the tracks 110, 112.

The tracks 110, 112 can comprise many types of tracks including, for example, I-beams, C-channels, magnetic rails, or simple beams. In some examples, as discussed above, the tracks 110, 112 themselves can form a free-standing frame 114. In other examples, the tracks 110, 112 can be attached to a separate free-standing frame 114. In still other examples, the tracks 110, 112 can be attached to one or more shelving units 102. The tracks 110, 112 can be detachably or permanently affixed to the one or more shelving units 102 with, for example, screws, bolts, clips, or adhesive. In yet other examples, the components of the shelving unit 102 can also serve as tracks 110, 112.

The RPS 106 can also comprise a control head 116. As discussed below, the control head 116 can comprise a locating system 118 comprising a plurality of motors, drive wheels, sensors, and other components to provide and control the movement of the RPS 106. In some examples, the control head 116 can also comprise one or more positioners 120. The positioners 120 can comprise a number of mechanisms to enable the RPS 106 to move inventory items 104 on the shelves 108. The positioners 120 can comprise, for example, an extender 122 (e.g., a telescoping pusher (shown), robotic arm, linear actuator, or other mechanism) capable of repositioning the inventory items 104 on the shelves 108. In some examples, as discussed below, the positioner 120 can also comprise an end effector 124, or a push plate, to enable the positioner 120 to move inventory items 104 back and forth on the shelves 108.

In some examples, as shown, the RPS 106 can be disposed between two sets 102a, 102b, or rows, comprising one or more shelving units. In this manner, the RPS 106 has access to a portion (e.g., the backs) of both sets 102a, 102b of shelving units 102. As shown in FIG. 1, in some examples, the control head 116 can comprise two telescoping positioners 120 to enable the RPS 106 to reposition inventory items 104 on both sets 102a, 102b of shelving units 102 by simply moving between various inventory locations and activating the appropriate positioner 120. Of course, the RPS 106 could also be used on a single shelving unit 102, or a single set 102a of shelving units 102 using a single positioner 120.

In some examples, as discussed below, rather than comprising two positioners 120, the RPS 106 can comprise a single, rotating positioner 120. In this manner, the positioner 120 can rotate to the appropriate position to face one of the sets 102a, 102b of shelving units 102 at a time. In still other embodiments, the RPS 106 can be disposed in the center of one or more shelving units 102 and can rotate to move inventory items 104 radially out on the shelves 108 in substantially all directions.

Figure 2:
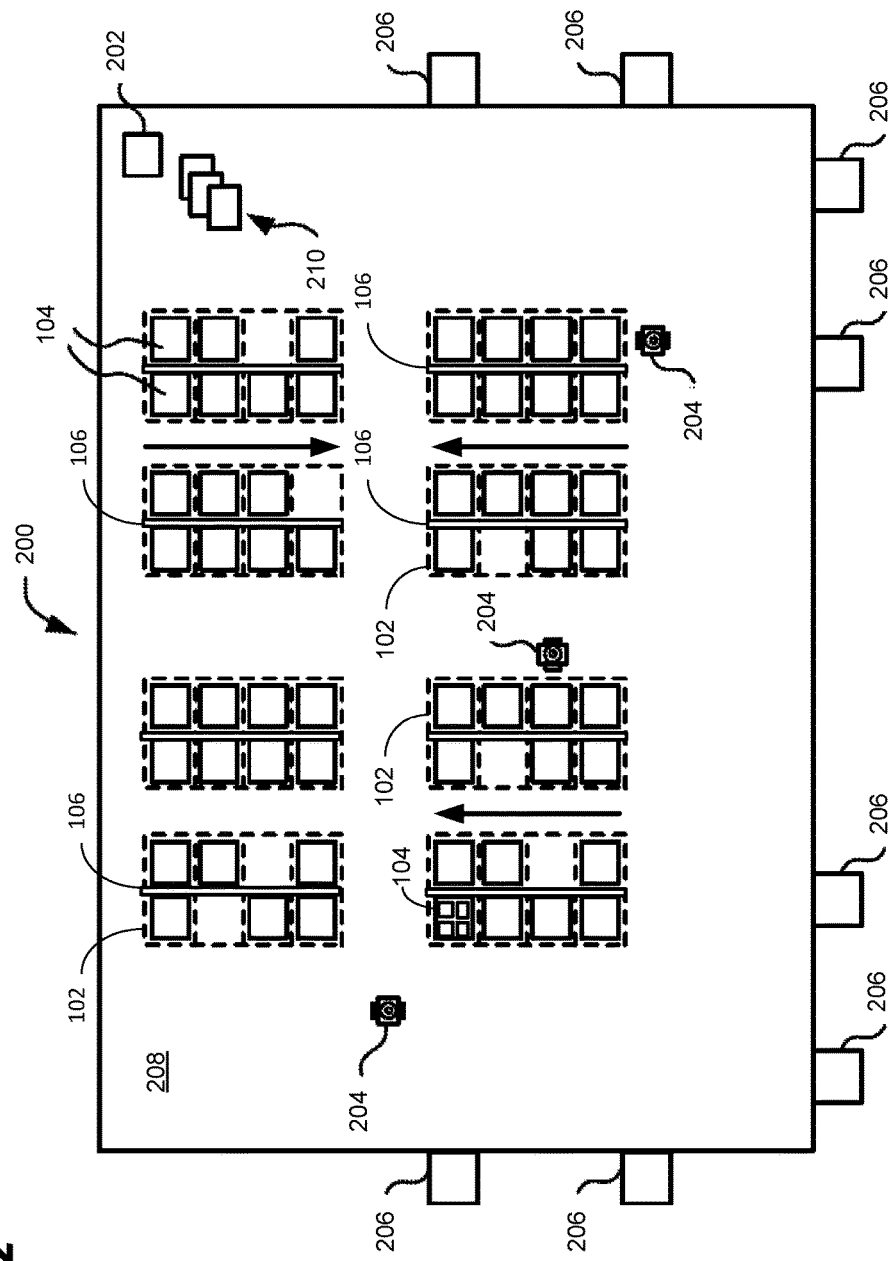
FIG. 2 depicts a warehouse including the RPS, in accordance with some examples of the present disclosure.

FIG. 2 illustrates an inventory control system 200 comprising a plurality of RPSs 106. The inventory control system 200 can comprise a management module 202, one or more mobile drive units, or robots 204, one or more shelving units 102 (also sometimes referred to as pods or bins), and one or more work stations 206. The shelving units 102 can comprise a plurality of shelves 108 storing a plurality of inventory items 104.

The shelving units 102 can further comprise the RPS 106. The RPS 106 can be positioned proximate, or attached, to the shelving units 102. In other words, the RPS 106 can be a component of the shelving unit 102 or can be a free-standing system. In some examples, the RPS 106 can move inventory items 104 on the shelves 108 of the shelving units 102 from the rear of the shelf 108 to the front of the shelf 108 for easy retrieval. In some examples, the RPS 106 may also be able to move inventory items 104 from the front of the shelf 108 to the back of the shelf 108 to enable items to be restocked, for example, or returned. In other examples, the RPS 106 can push inventory items 104 completely off the shelf 108 of the shelving units 102 to a waiting robot 204, cart, or other receptacle. This can enable inventory items 104 to be retrieved with little, or no, human intervention.

In some examples, the management module 202 can receive orders for inventory items 104 stored in the warehouse 208. The management module 202 can include a database (or can have access to a database) of the locations of each inventory item 104 including, for example, the shelving unit number, shelf number, and/or position on the shelf of the inventory item 104. Upon receiving an order, the management module 202 can provide the location of the inventory item 104 to the robot 204 and the RPS 106 for retrieval.

In some examples, based on the location information, the RPS 106 can locate the inventory item 104 on the shelf 108 of the shelving unit 102 and push the inventory item 104 to the front of the shelf 108 where it is easily accessible. Using the same location information, the robot 204 can locate and transport the shelving unit 102 between its storage location in the warehouse 208 and one of the work stations 206. The robots 204 can navigate to locations on their own (e.g., using GPS, fiducials, or other mapping techniques), or in response to direct commands communicated by the management module 202. At the work station 206, a worker can remove the inventory item 104 from the shelf 108 for additional processing.

The removal of the inventory item 104 from the shelf 108 is made easier and safer by the RPS 106. Because the inventory item 104 is pushed to the edge of the shelf 108, for example, it is easier for the worker to see the label packaging, or other indicia, to identify the inventory item 104. In addition, in cases where the shelving units 102 are very tall or the shelves 108 are very deep, positioning the inventory item 104 at the edge of the shelf 108 reduces the tendency for the worker to climb on, or reach into, the shelf 108 to retrieve the inventory item 104. In addition, positioning the inventory item 104 at the edge of the shelf enables the worker to see the inventory item 104, to properly identify it, and to avoid picking up the object awkwardly or picking it up by a sharp, pointed, or delicate element of the inventory item 104. On lower shelves, for example, positioning the inventory item 104 close to the edge of the shelf 108 can also reduce the need to bend over or stoop to remove inventory items 104.

In other examples, rather than retrieving the entire shelving unit 102, the robot 204 can simply retrieve the inventory item 104. In this configuration, the RPS 106 can once again locate the inventory item 104 on the shelf 108 of the shelving unit 102. Similarly, the robot 204 can travel to the shelving unit 102 using suitable means. In this case, however, the robot 204 can position itself in front of the shelving unit 102 to receive the inventory item 104 directly. In some examples, as discussed below, the robot 204 can comprise a lift, robotic arm, or other means to receive the inventory item 104 from the RPS 106. The robot 204 can then deliver the inventory items 104 to a worker at the work station 206 for packaging, or directly to a shipping station for delivery (e.g., if the inventory item 104 is already packaged).

The inventory control system 200 is capable of moving inventory items 104 and/or shelving units 102 between locations within a workspace, such as a storage facility or warehouse 208 to facilitate the stocking, processing, and/or removal of inventory items 104 from the inventory control system 200 and the completion of other tasks involving the inventory items 104. The management module 202 can assign tasks to the appropriate components (e.g., the RPS 106 and robots 204) of the inventory control system 200 and coordinate operation of the various components in completing the tasks. These tasks may relate both to the movement and processing of inventory items and the management and maintenance of the components of inventory control system 200.

The management module 202 may select components of the inventory control system 200 to perform these tasks and communicate appropriate commands and/or data to selected components to facilitate completion of these operations. Although shown in FIG. 2 as a single, discrete component, the management module 202 may represent multiple components and may represent, or include, portions of the robots 204, RPS 106, or other elements of the inventory control system 200. As a result, any or all of the interaction between a particular robot 204 or the RPS 106 and the management module 202 that is described below may, for example, represent peer-to-peer communication between that robot 204 and one or more other robots 204 or the RPS 106, or may comprise internal commands based on memory in the robot 204 or control head 116, for example.

As mentioned above, the robots 204 can be used to move shelving units 102 between locations within the warehouse 208. The robots 204 may represent many types of devices or components appropriate for use in inventory control system 200 based on the characteristics and configuration of shelving units 102, RPS 106, and/or other elements of inventory control system 200. In a particular embodiment of inventory control system 200, the robots 204 can represent independent, self-powered devices, such as wheeled or tracked robots or robotic carts, for example, configured to freely move about warehouse 208. Examples of such inventory control systems (without the RPS 106) are disclosed in U.S. Pat. No. 9,087,134, published on Jun. 7, 2012, titled "SYSTEM AND METHOD FOR POSITIONING A MOBILE DRIVE UNIT," and U.S. Pat. No. 8,280,547, issued on Oct. 2, 2012, titled "METHOD AND SYSTEM FOR TRANSPORTING INVENTORY ITEMS," the entire disclosures of which are herein incorporated by reference.

In other examples, the robots 204 can comprise track guided robots configured to move shelving units 102 along tracks, rails, cables, a crane system, or other guidance or support elements traversing the warehouse 208. In this configuration, the robots 204 may receive power, communications, and/or support through a connection to guidance elements such as, for example, a powered rail, slot, or track. Additionally, in some examples of the inventory control system 200, the robots 204 may be configured to utilize alternative conveyance equipment to move within warehouse 208 and/or between separate portions of warehouse 208.

Additionally, the robots 204 may be capable of communicating with the management module 202 to receive tasks, shelving unit 102 assignments, transmit their locations or the locations of other robots 204, or exchange other suitable information to be used by management module 202 or robots 204 during operation. The robots 204 may communicate with management module 202 using, for example, wireless, wired, or other connections. In some examples, the robots 204 may communicate with management module 202 and/or each other using, for example, 802.11 specification wireless transmissions (e.g., b/g/n), Bluetooth, radio frequency (RF), Infrared Data Association (IrDA) standards, or other appropriate wireless communication protocols.

In other examples, such as in an inventory control system 200 using tracks, the tracks or other guidance elements (e.g., slots or rails) along which robot 204 moves may be wired to facilitate communication between robot 204 and other components of inventory control system 200. Furthermore, as noted above, the robots 204 may include components of the management module 202 such as, for example, processors, modules, memory, and transceivers. Thus, for the purposes of this description and the claims that follow, communication between management module 202 and a particular robot 204 may also represent communication between components within a particular robot 204. In general, the robots 204 can be powered, propelled, and controlled in many ways based on the configuration and characteristics of a particular inventory control system 200.

The shelving units 102 can be used to store inventory items 104 and can include additional features as part of the inventory control system 200. In some examples, each of the shelving units 102 can include multiple dividers to create multiple bays within the storage shelving unit 102. In this configuration, each storage shelving unit 102 can store one or more types of inventory items 104 in each bay (e.g., each shelving unit 102 may store the same inventory item 104 in all bays, or different inventory items 104 in each bay, or have no bays and store just one type of inventory item 104). Additionally, in particular examples, inventory items 104 may move in tracks or hang from hooks or bars within, or on, the shelving units 102. In general, the shelving units 102 may store inventory items 104 in any appropriate manner within the shelving units 102 and/or on the external surface of shelving units 102.

The shelving units 102 can be configured to be carried, rolled, and/or otherwise moved by the robots 204. In some examples, the shelving units 102 may also provide propulsion to supplement that provided by the robot 204 when moving multiple shelving units 102, for example. Additionally, each shelving unit 102 may include a plurality of sides, and each shelving unit 102 may be accessible through one or more sides of the shelving units 102. For example, in a particular embodiment, the shelving units 102 include four sides. In such an embodiment, shelving units 102 located at a corner of two sides may be accessible through either of those two sides, while each of the other bins is accessible through an opening in one of the four sides and a free-standing shelving unit 102 may be accessible via all four sides. The robot 204 may be configured to rotate shelving units 102 at appropriate times to present a particular face and the shelves or dividers associated with that face to an operator or other components of inventory control system 200 to facilitate removal, storage, counting, or other operations with respect to inventory items 104.

In particular examples, the inventory control system 200 may also include one or more work stations 206. Work stations 206 represent locations designated for the completion of particular tasks involving inventory items 104. Such tasks may include the removal of inventory items 104, the addition, or restocking, of inventory items 104, the counting of inventory items 104, the unpacking of inventory items 104 (e.g. from pallet- or case-sized groups to individual inventory items 104), the consolidation of inventory items 104 between shelving units 102, and/or the processing or handling of inventory items 104 in any other suitable manner. The work stations 206 may represent both the physical location and also any appropriate equipment for processing or handling inventory items 104, such as work benches, packing tools and supplies, scanners for monitoring the flow of inventory items 104 in and out of inventory control system 200, communication interfaces for communicating with management module 202, and/or any other suitable components. Work stations 206 may be controlled, entirely or in part, by human operators or may be partially or fully automated.

In operation, the management module 202 selects appropriate components to complete particular tasks and transmits task assignments 210 to the selected components. These tasks may relate to the retrieval, storage, replenishment, and counting of inventory items 104 and/or the management of robots 204, shelving units 102, work stations 206, RPS 106, and other components of inventory control system 200. Depending on the component and the task to be completed, a particular task assignment 210 may identify locations, components, and/or actions associated with the corresponding task and/or any other appropriate information to be used by the relevant component in completing the assigned task.

In particular examples, the management module 202 generates task assignments 210 based, in part, on inventory requests that management module 202 receives from other components of inventory control system 200 and/or from external components in communication with management module 202. For example, in particular examples, an inventory request may represent a shipping order specifying particular inventory items 104 that have been purchased by a customer and that are to be retrieved from inventory control system 200 for shipment to the customer. The management module 202 may also generate task assignments 210 in response to the occurrence of a particular event (e.g., in response to a robot 204 requesting a space to park), according to a predetermined schedule (e.g., as part of a daily start-up or cleaning routine), or at any appropriate time based on the configuration and characteristics of inventory control system 200.

The management module 202 may also, in particular examples, communicate task assignments 210 to a robot 204 that include one or more destinations for the robot 204. In this vein, the management module 202 may select a robot 204 based on the location or state of the robot 204, an indication that the robot 204 has completed a previously-assigned task, a predetermined schedule, and/or any other suitable consideration. For example, the task assignment 210 may define the location of a shelving unit 102 to be retrieved, a work station 206 to be visited, a storage location where the robot 204 should park until receiving another task, or a location associated with any other task appropriate based on the configuration, characteristics, and/or state of inventory control system 200, as a whole, or individual components of inventory control system 200.

As part of completing these tasks, the robots 204 may dock with various shelving units 102 within the warehouse 208. The robots 204 may dock with shelving units 102 by connecting to, lifting, and/or otherwise interacting with shelving units 102 such that, when docked, the robots 204 are coupled to the shelving units 102 and can move shelving units 102 within the warehouse 208. While the description below focuses on particular examples of robots 204 and shelving units 102 that are configured to dock in a particular manner, alternative examples of robots 204 and shelving units 102 may be configured to dock in any manner suitable to allow robots 204 to move shelving units 102 within warehouse 208.

Components of inventory control system 200 may provide information to the management module 202 regarding their current state, the state of other components of inventory control system 200 with which they are interacting, and/or other conditions relevant to the operation of inventory control system 200. This may allow management module 202 to utilize feedback from the relevant components to update algorithm parameters, adjust policies, or otherwise modify its decision-making to respond to changes in operating conditions or the occurrence of particular events. In addition, while management module 202 may be configured to manage various aspects of the operation of the components of inventory control system 200, in particular examples, the components themselves may also be responsible for some decision-making relating to certain aspects of their operation, thereby reducing the processing load on management module 202.

Figure 3A:
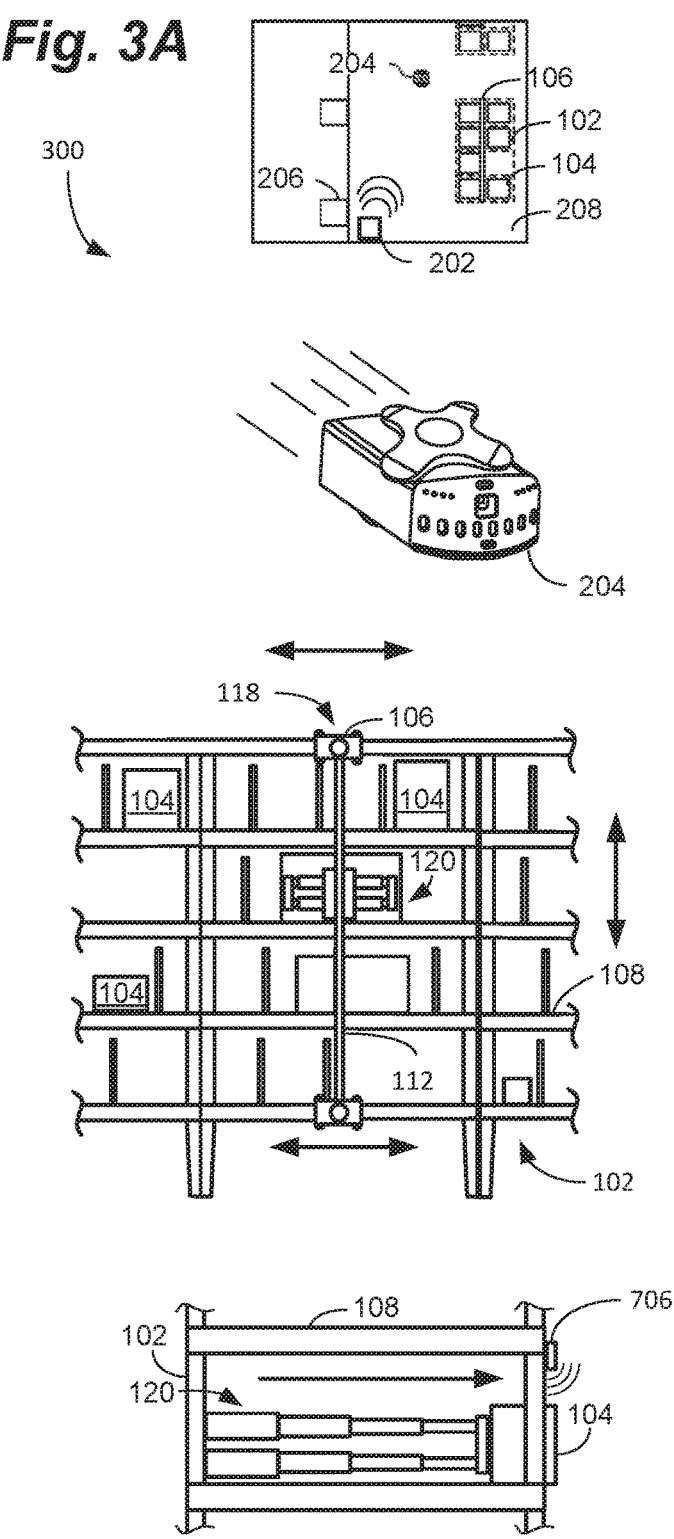
FIGS. 3A and 3B are flowcharts depicting the RPS positioning an inventory item prior to a robot taking an inventory holder to a work station, in accordance with some examples of the present disclosure.
Figure 3A:
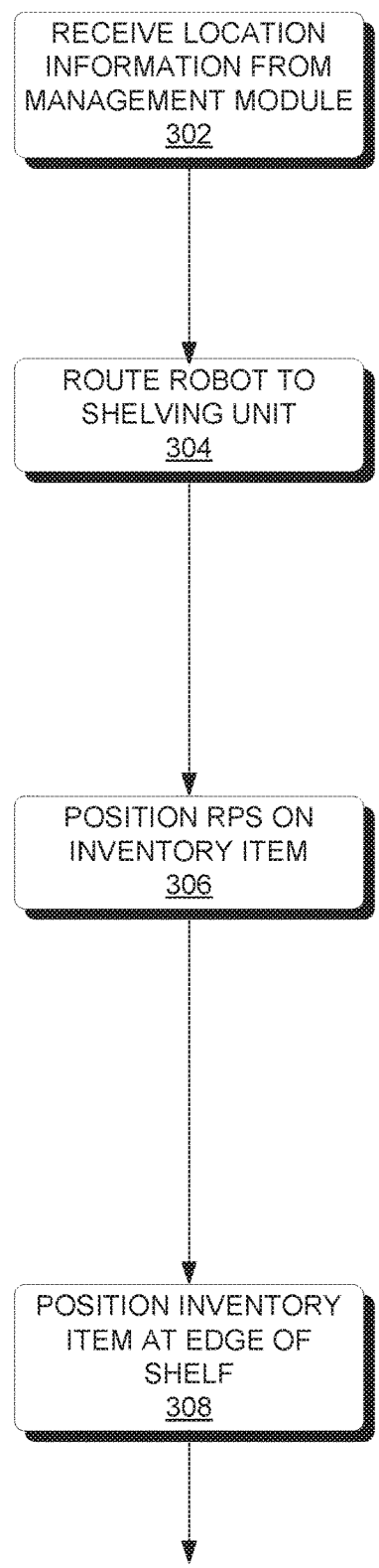
Figure 3B:
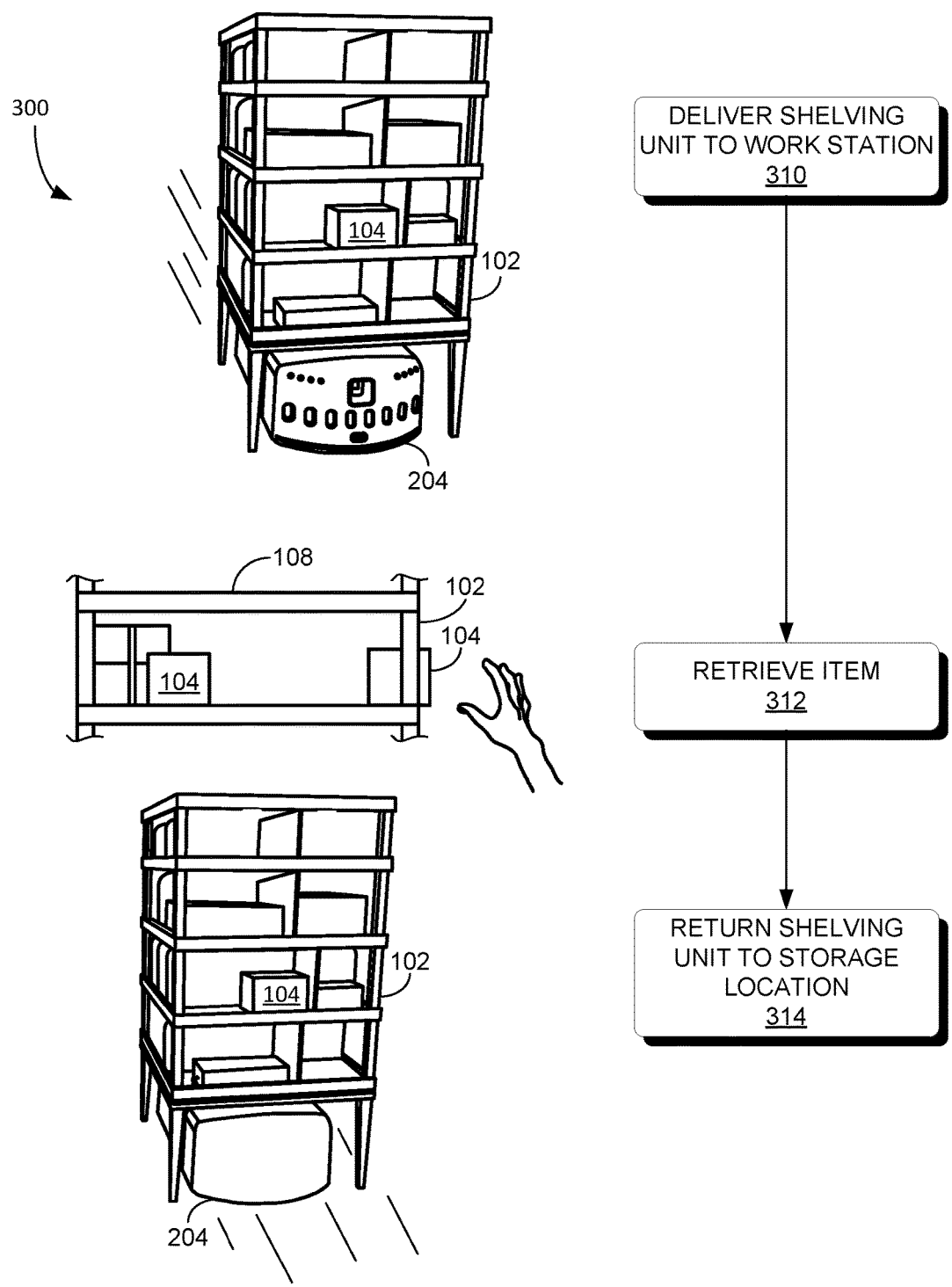

As shown in FIGS. 3A and 3B, examples of the present disclosure can comprise a method 300 for relocating an inventory item 104 on the shelf 108 of a shelving unit 102 and then delivering the shelving unit 102 to a work station 206. To this end, the management module 202 can receive an order for an inventory item 104 stored in the warehouse 208. The order can be received by another component of the inventory control system 200, for example, such as a website, cash register, or terminal. At 302, based on a database of inventory items 104 in the warehouse 208, the management module 202 can provide the location of the inventory items 104 to the robot 204 and the RPS 106.

At 304, the robot can be routed to the appropriate shelving unit 102. In some examples, the management module 202 can provide directions to the robot 204 based on fiducials in the warehouse 208, using directions, or other means. In other examples, the management module 202 can simply provide location information (e.g., GPS coordinates) to the robot 204 and the robot 204 can navigate to the location autonomously. In still other embodiments, the management module 202 can simply provide a shelving unit 102 control number or inventory number. In this configuration, the robot 204 can consult an internal or external database to obtain location information for the shelving unit 102. In yet other examples, the management module 202 can simply provide the robot 204 with the inventory number for the inventory item 104 and the robot 204 can consult the internal or external database for location information.

At 306, the RPS 106 can position itself in the appropriate place on the shelving unit 102 behind the desired inventory item 104. The RPS 106 can move to the correct shelving unit 102, for example, the correct position on a particular shelf 108 (or row) and the correct position on the shelf 108 (or column). As with the robot 204, in some examples, the RPS 106 can be provided with directions from the management module 202 based on a relative coordinate system (e.g., move two feet right and one foot up from your current position). In other examples, the management module 202 can provide directions in an absolute coordinate system (e.g., move to X=5.3 feet and Y=2.5 feet from an origin). In still other examples, the management module 202 can provide the RPS 106 with the shelving unit number, shelf number, and/or shelf position. In yet other examples, the management module 202 can simply provide the RPS 106 with the inventory number for the inventory item 104 and the RPS 106 can consult an internal or external database for location information.

At 308, the RPS 106 can position the inventory item 104 at, or near, the edge of the shelf 108. This can be done by using a telescoping arm (shown), linear actuator, robotic arm, or other means capable of pushing the inventory item 104 without damage. As discussed below, the RPS 106 can include an adjustable end effector 124 to adjust to different sized inventory items 104. As discussed above, pushing the inventory item 104 to the edge of the shelf 108 can enable the inventory item 104 to be more easily identified and retrieved from the shelving unit 102 by a worker or automated system. A shelving unit 102 may comprise a proximity sensor 706 to enable the RPS 106 to determine when the inventory item is proximate a front edge of the shelf 108. The proximity sensor 706 is discussed in more detail below with reference to FIGS. 7A, 7B, 8A, and 8B.

At 310, the robot 204 can deliver the shelving unit 102 to a work station 206. In some examples, a worker may retrieve the inventory item 104 for fulfillment of an order. Pushing the inventory item 104 item to the edge of the shelf 108 assists the worker in locating and identifying the inventory item 104. The inventory item 104 is easier to identify simply because it is easier to see at the front of the shelving unit 102. The inventory item 104 is easier to locate because it is at the edge of the shelf 108, while the remaining inventory items 104 are somewhat more recessed.

In other examples, the worker may be restocking the inventory item 104. In this case, pushing the inventory item 104 to the edge of the shelf 108 enables the worker to easily identify the stocking location for the inventory item 104. If the worker is taking inventory, on the other hand, the RPS 106 can be used to push all stock to the front of the shelving unit 102. This can increase inventory counting speed and accuracy. As the worker completes the inventory, the worker can push the inventory items 104 back slightly, for example, to signify that they have been counted.

At 312, when fulfilling an order, for example, the worker can retrieve the inventory item 104 from the shelving unit 102 for additional processing and/or shipping. At 314, when complete, the robot 204 can return the shelving unit 102 to its original location or another location in the warehouse 208.

Figure 3C:
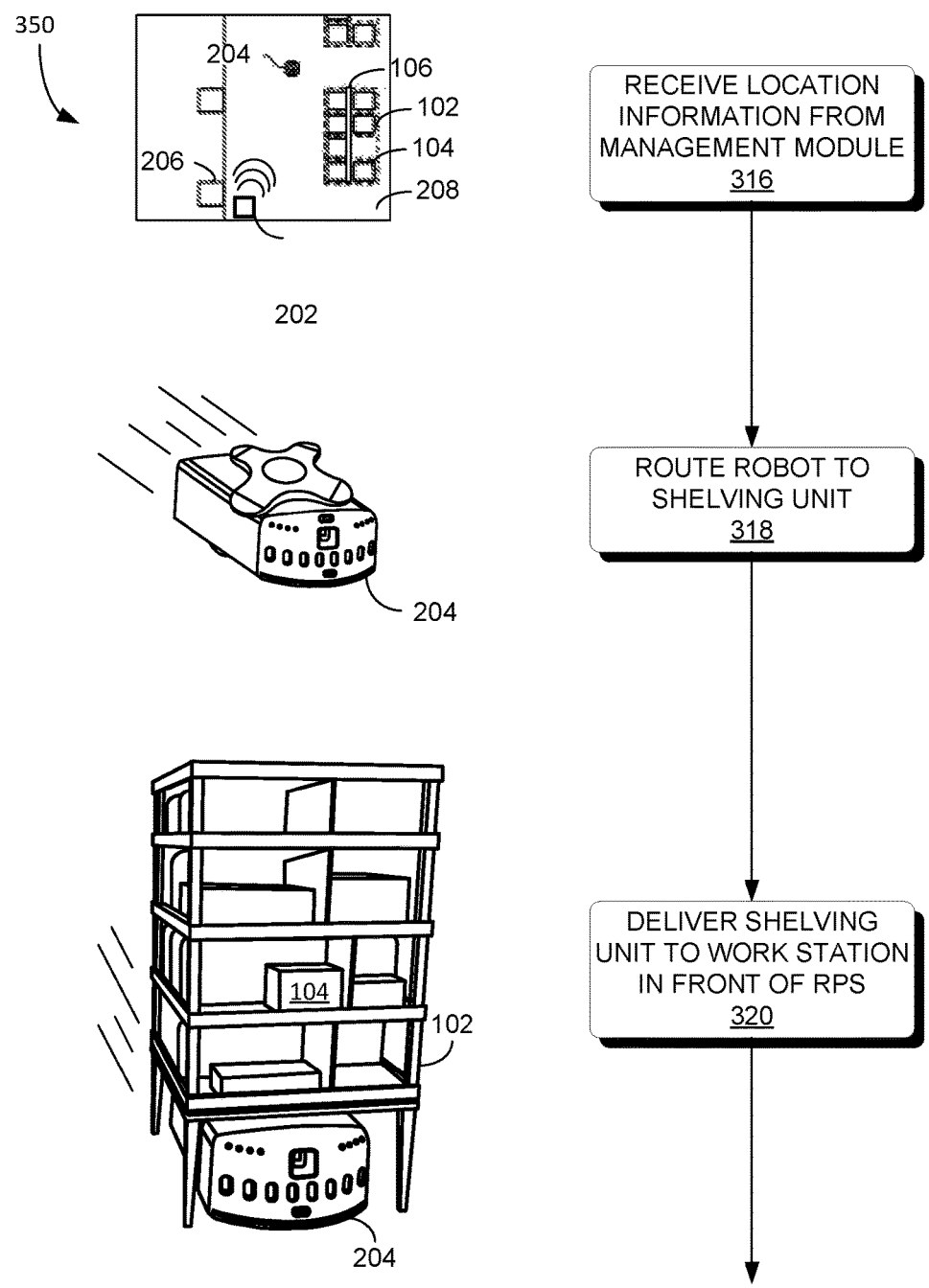

In some examples, as shown in FIGS. 3C and 3D, rather than having an RPS 106 associated with each shelving unit 102, the RPS 106 could be associated with the work station 206. In other words, rather than repositioning the inventory item 104 prior to retrieving the shelving unit 102, the shelving unit 102 can be delivered to the work station 206 and placed in front of an RPS 106 located in the work station 206. In some examples, as shown, the RPS 106 can be a free-standing unit proximate the work station 206. In other examples, the RPS 106 could be mounted to the work station 206. In still other examples, the RPS 106 could be mounted on, or proximate to, a conveyor or packaging system, and could move inventory items 104 directly onto a conveyor belt, for example.

At 316, based on a database of inventory items 104 in the warehouse 208, the management module 202 can provide the location of the inventory items 104 to the robot 204 and the RPS 106. At 318, the robot can be routed to the appropriate shelving unit 102. In some examples, the management module 202 can provide directions to the robot 204 based on fiducials in the warehouse 208, using directions, or other means. In other examples, the management module 202 can simply provide location information (e.g., GPS coordinates) to the robot 204 and the robot 204 can navigate to the location autonomously. In still other embodiments, the management module 202 can simply provide a shelving unit 102 control number or inventory number. In this configuration, the robot 204 can consult an internal or external database to obtain location information for the shelving unit 102. In yet other examples, the management module 202 can simply provide the robot 204 with the inventory number for the inventory item 104 and the robot 204 can consult the internal or external database for location information.

At 320, the robot 204 can deliver the shelving unit 102 to a work station 206 in front of the RPS 106. In some examples, the robot 204 can use fiducials (marks on the floor), GPS, or other means to accurately position the shelving unit 102 in front of the RPS 106. In other examples, the RPS 106 can comprise magnets, sensors, lights, or other mechanisms to enable the robot 204 to properly position the shelving unit 102. Because the RPS 106 can be in a fixed location at the work station 206, in some examples, the robot 204 can simply return to a predetermined location every time.

At 322, the RPS 106 can position itself in the appropriate place on the shelving unit 102 behind the desired inventory item 104. The RPS 106 can move to the correct shelving unit 102, for example, the correct position on a particular shelf 108 (or row) and the correct position on the shelf 108 (or column). As with the robot 204, in some examples, the RPS 106 can be provided with directions from the management module 202 based on a relative coordinate system (e.g., move two feet right and one foot up from your current position). In other examples, the management module 202 can provide directions in an absolute coordinate system (e.g., move to X=5.3 feet and Y=2.5 feet from an origin). In still other examples, the management module 202 can provide the RPS 106 with the shelving unit number, shelf number, and/or shelf position. In yet other examples, the management module 202 can simply provide the RPS 106 with the inventory number for the inventory item 104 and the RPS 106 can consult an internal or external database for location information.

At 324, the RPS 106 can position the inventory item 104 at, or near, the edge of the shelf 108. This can be done by using a telescoping arm (shown), linear actuator, robotic arm, or other means capable of pushing the inventory item 104 without damage. As discussed below, the RPS 106 can include an adjustable end effector 124 to adjust to different sized inventory items 104. As discussed above, pushing the inventory item 104 to the edge of the shelf 108 can enable the inventory item 104 to be more easily identified and retrieved from the shelving unit 102 by a worker or automated system. A shelving unit 102 may comprise a proximity sensor 706 to enable the RPS 106 to determine when the inventory item is proximate a front edge of the shelf 108. The proximity sensor 706 is discussed in more detail below with reference to FIGS. 7A, 7B, 8A, and 8B.

At 326, when fulfilling an order, for example, the worker can retrieve the inventory item 104 from the shelving unit 102 for additional processing and/or shipping. At 328, when complete, the robot 204 can return the shelving unit 102 to its original location or another location in the warehouse 208. Of course, while shown in use with a work station 206 and a worker, the RPS 106 could also be used in concert with an automated system. In some examples, the RPS 106 could move inventory items 104 off the shelving unit 102 and onto a conveyor system, a ramp, chute or slide, a table, a bin or container, an automated cart, or an automated packaging and/or shipping system.

Figure 4A:
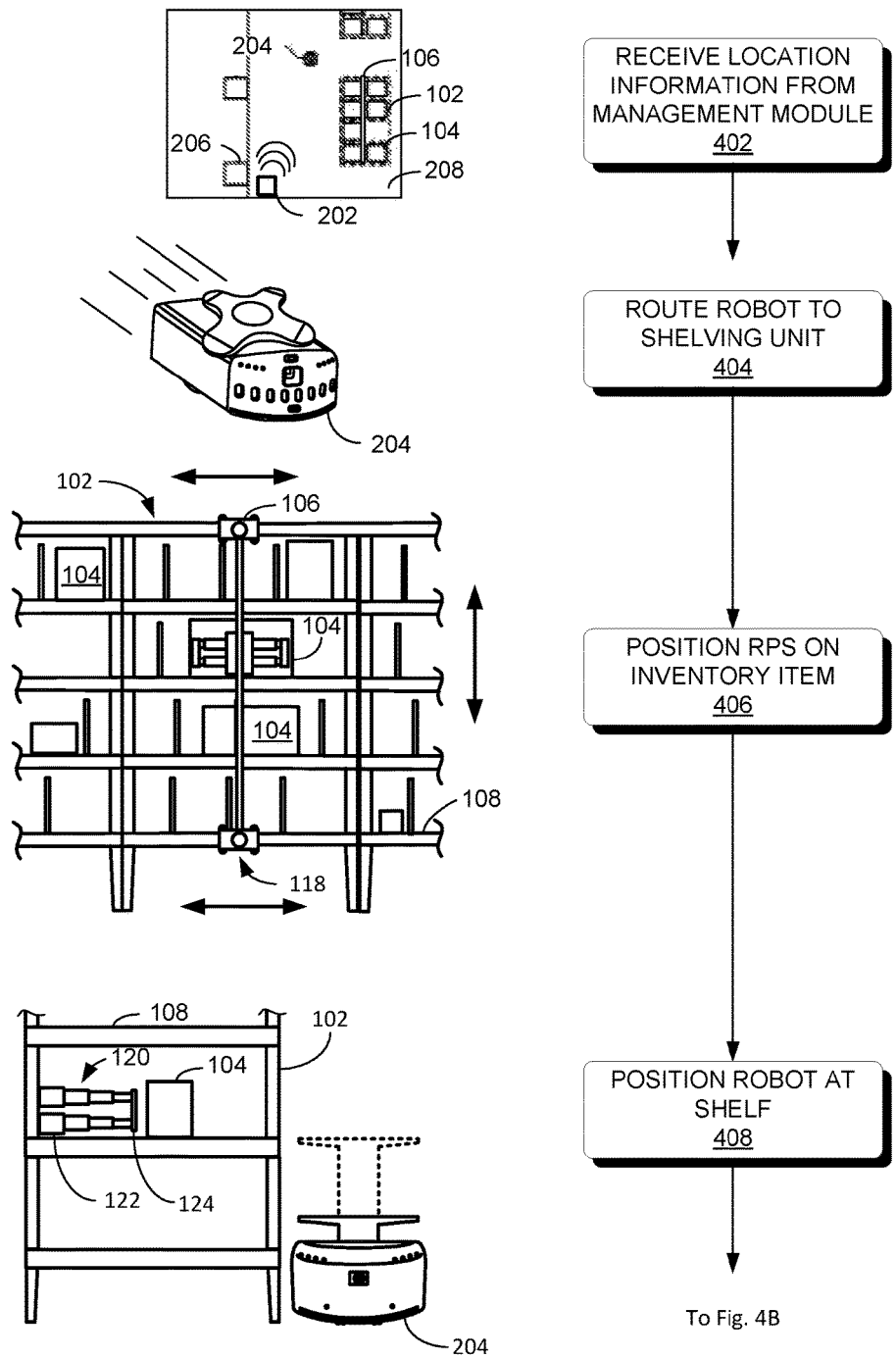

As shown in FIGS. 4A and 4B, in some examples, rather than retrieving the entire shelving unit 102, the robot 204 can retrieve just the inventory item 104. As before, at 402, based on a database of inventory items 104 in the warehouse 208, the management module 202 can provide the location of the inventory items 104 to the robot 204 and the RPS 106.

At 404, the robot can be routed to the appropriate shelving unit 102. As discussed above, in some examples, the management module 202 can provide directions to the robot 204 based on fiducials in the warehouse 208, using directions, or other means. In other examples, the management module 202 can simply provide location information (e.g., GPS coordinates) to the robot 204 and the robot 204 can navigate to the location autonomously. In still other embodiments, the management module 202 can simply provide a shelving unit 102 control number or inventory number. In this configuration, the robot 204 can consult an internal or external database to obtain location information for the shelving unit 102. In yet other examples, the management module 202 can simply provide the robot 204 with the inventory number for the inventory item 104 and the robot 204 can consult the internal or external database for location information.

At 406, the RPS 106 can position itself in the appropriate place on the shelving unit 102 behind the desired inventory item 104. As with the robot 204, in some examples, the RPS 106 can be provided directions from the management module 202 based on a relative coordinate system (e.g., move two feet right and one foot up from your current position). In other examples, the management module 202 can provide directions in an absolute coordinate system (e.g., move to X=5.3 feet and Y=2.5 feet from the origin). In still other examples, the management module 202 can provide the RPS 106 with the shelving unit number, shelf number, and/or shelf position. In yet other examples, the management module 202 can simply provide the RPS 106 with the inventory number for the inventory item 104 and the RPS 106 can consult an internal or external database for location information.

At 408, the robot 204 can position itself in front of the appropriate shelf 108 on the shelving unit 102. For shelving units 102 with multiple sides, or faces, this can include the robot 204 positioning itself on the correct side of the shelving unit 102. In other words, as discussed below, the RPS 106 can be configured to provide inventory items 104 to two, four, or more sides of the shelving unit 102. In some examples, the robot 204 can also comprise a platform, lift, cart, or other mechanism, to enable the RPS 106 to push the inventory item 104 directly onto the robot 204. In other examples, the robot 204 can comprise a net, container or bin to catch the inventory item 104 as it drops from the shelf 108.

At 410, the RPS 106 can push the inventory item 104 onto the robot 204. In some examples, the robot 204 and/or the RPS 106 can comprise one or more sensors to determine when the inventory item 104 has been received by the robot 204. At 412, the robot 204 can deliver the inventory item 104 to the work station 206 for additional processing. At 414, a worker at the work station 206 can retrieve the inventory item 104. Of course, in some examples, the robot 204 can simply deposit the inventory item 104 at the work station 206 (e.g., if the worker is busy or on break). Delivering the inventory item 104 to the work station 206 (as opposed to the shelving unit 102) reduces the payload requirements for the robot 204 and reduces the time required for the worker to retrieve the inventory item—at least because they do not have to locate or retrieve it from the shelving unit 102. In addition, delivering the inventory items 104 directly can reduce congestion in the warehouse 208 because the robots 204 are generally carrying much smaller payloads.

In still other embodiments, the robot 204 could be used to move the RPS 106 between shelving units 102. In other words, prior to retrieving the inventory item 104, or the shelving unit 102, as described above, the robot 204 could first move the RPS 106 from its current location—e.g., a first shelving unit 102 associated with a previous pick—to a new location, such as a second shelving unit 102 associated with a new pick. In this manner, each RPS 106 could be used on multiple shelving units 102 or in multiple work stations 206 simply by moving the RPS 106 from place to place, as needed. Indeed, in some examples, the RPS 106 could have wheels enabling a worker to move the RPS 106 manually.

Figure 5A:
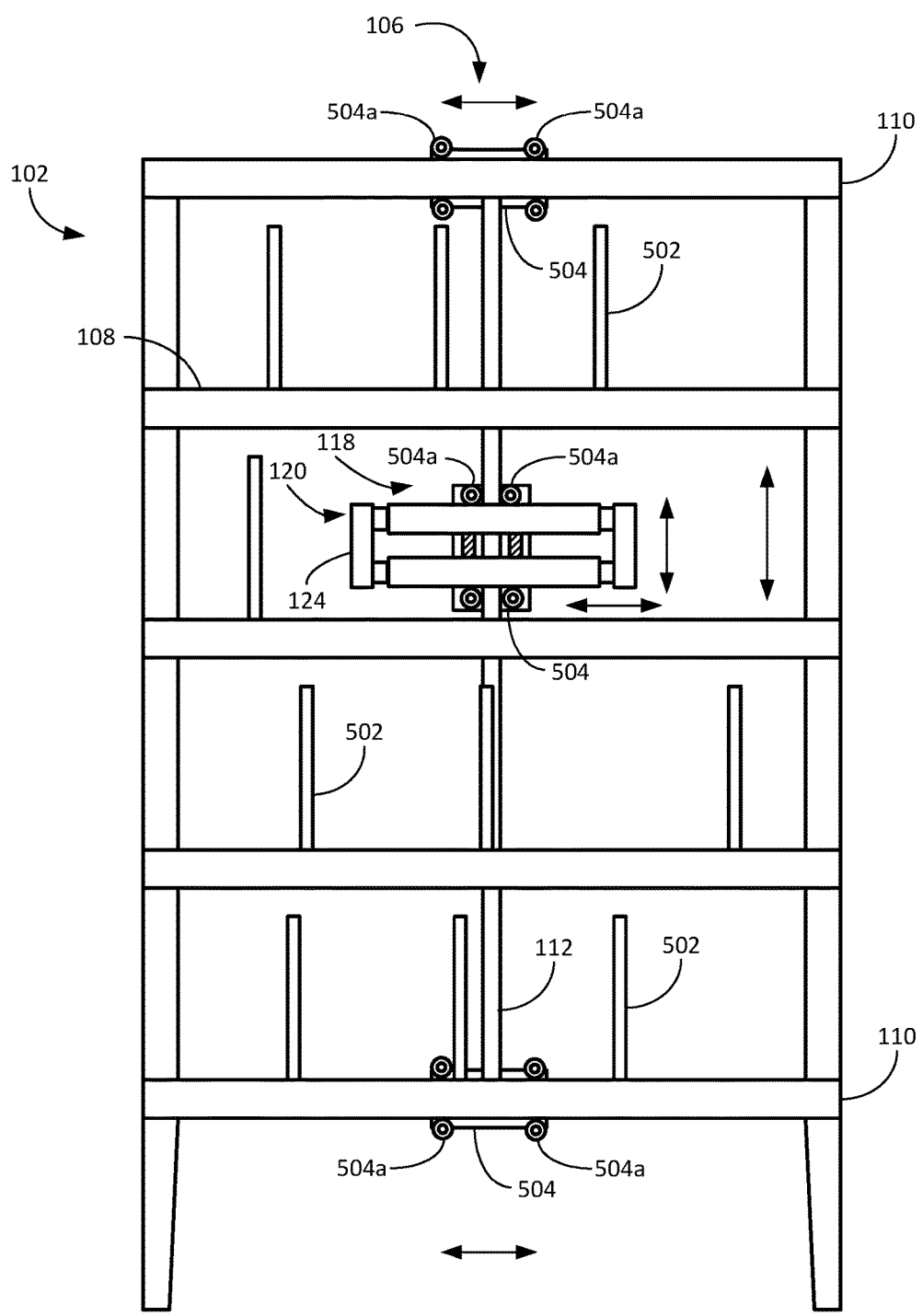
FIGS. 5A and 5B depict the front (FIG. 5A) and the back (FIG. 5B) of an exemplary RPS, in accordance with some examples of the present disclosure.
Figure 5B:
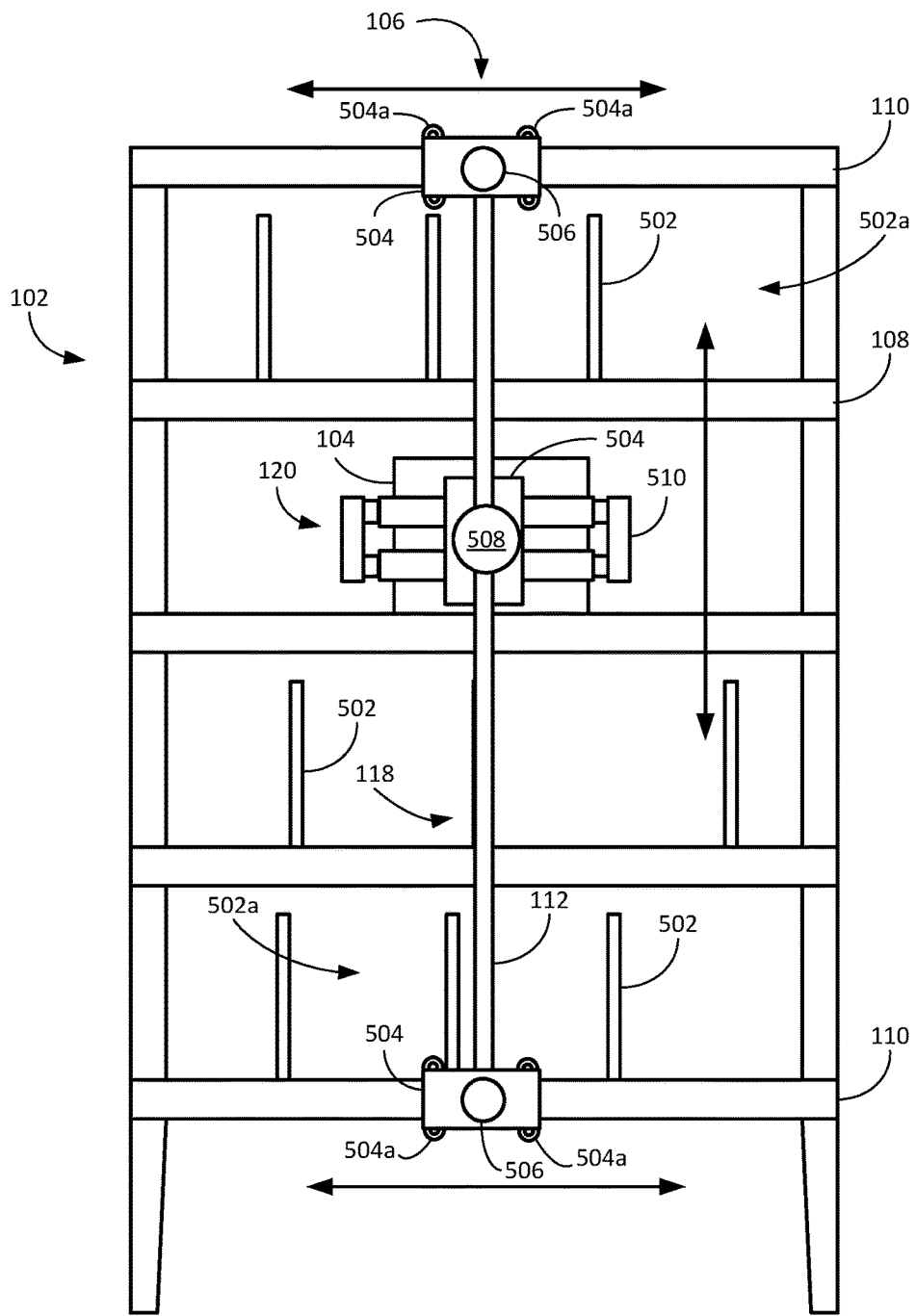

FIGS. 5A and 5B depict the RPS 106 mounted on a shelving unit 102 from the front (FIG. 5A) and the back (FIG. 5B). As discussed above, the shelving unit 102 can comprise a plurality of shelves 108 for storing inventory items 104. In some examples, the shelving units 102 can also comprise a plurality of adjustable vertical dividers 502. The vertical dividers 502 can be removable and repositionable to enable the shelves 108 to be tailored to various inventory items 104. The vertical dividers 502 can enable each shelf 108 to be divided into one or more bays 502a sized and shaped for inventory items 104 of various sizes and shapes. As discussed below, the vertical dividers 502 can also enable the RPS 106 to safely reposition inventory items 104 of different shapes.

As shown, the locating system 118 can comprise a horizontal track 110 and a vertical track 112. In some examples, the tracks 110, 112 can be included on a standalone frame 114, as shown in FIG. 1. In other examples, the tracks 110, 112 can be attached to the back, the middle, or any other location of one or more shelving units 102. In still other embodiments, the RPS 106 can use one or more shelves 108 of the shelving units 102 for at least the horizontal track 110.

In some examples, as shown, the vertical track 112 can include one or more trucks 504 located on one, or both, ends of the vertical track 112. Each truck 504 can include one or more guide wheels 504a and one or more horizontal actuators 506. The horizontal actuators 506 and/or guide wheels 504a can enable the locating system 118 to move the RPS 106 back and forth (along the X-axis) on the back of the shelving units 102. This can enable the RPS 106 to position itself in the correct "column" for a respective inventory items 104.

The locating system 118 can also include a control head 116. The control head 116 can also include one or more trucks 504 comprising one or more guide wheels 504a. In some examples, the control head 116 can include one or more vertical actuators 508 to enable the control head 116 to move up and down on the shelving units 102. This can enable the RPS 106 to locate the correct shelf 108, or "row," on the shelving units 102 for the inventory items 104. The actuators 506, 508 can comprise, for example, standard electric motors, servo motors, or linear actuators.

The RPS 106 can also include a positioner 120. In some examples, as shown, the positioner 120 can include an end effector 124 for interfacing with the inventory items 104. In some examples, the end effector 124 can comprise one or more horizontally adjustable bars 512 and one or more vertically adjustable bars 514. The horizontally adjustable bars 512 can enable the end effector 124 to adjust to the width of the inventory items 104, while the vertically adjustable bars 514 can enable the end effector 124 to adjust to the height of the inventory items 104, or the shelf 108.

As discussed below, in some examples, the end effector 124 can use one or more sensors to detect objects and adjust appropriately. In some examples, the end effector 124 can adjust horizontally based on the placement of the vertical dividers 502. In other examples, the end effector 124 can adjust vertically based on the height of the shelf 108 or the height of the inventory items 104. Adjusting the size of the end effector 124 reduces surface pressure on the inventory items 104, which can reduce damage, among other things. In addition, adjusting the height of the end effector 124 can prevent tall objects from falling over, including falling behind the end effector 124 as it extends. In addition, adjusting the width of the end effector 124 can prevent small objects from becoming trapped behind the end effector 124 as it extends.

Referring back to FIG. 1, in some examples, the positioner 120 can also comprise an extender 122 to move the end effector 124 back and forth between the front and back of the shelves 108. The extender 122 can comprise, for example, one or more telescoping components, folding arms, or linear actuators to enable substantially linear movement from front to back, and vice-versa, on the shelves 108.

Figure 6A:
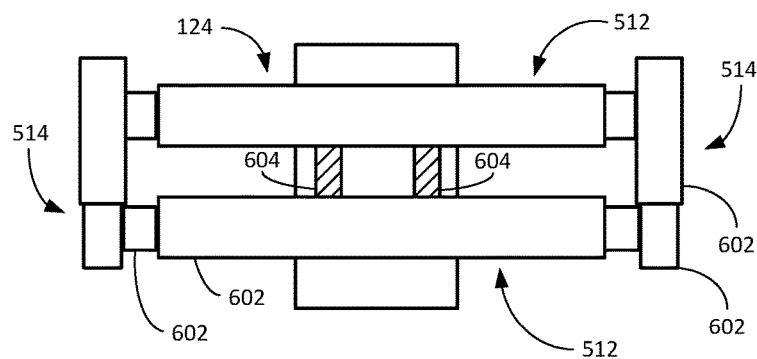
FIGS. 6A-6C depict an end effector in the closed, horizontally extended, and vertically extended positions, respectively, in accordance with some examples of the present disclosure.
Figure 6B:
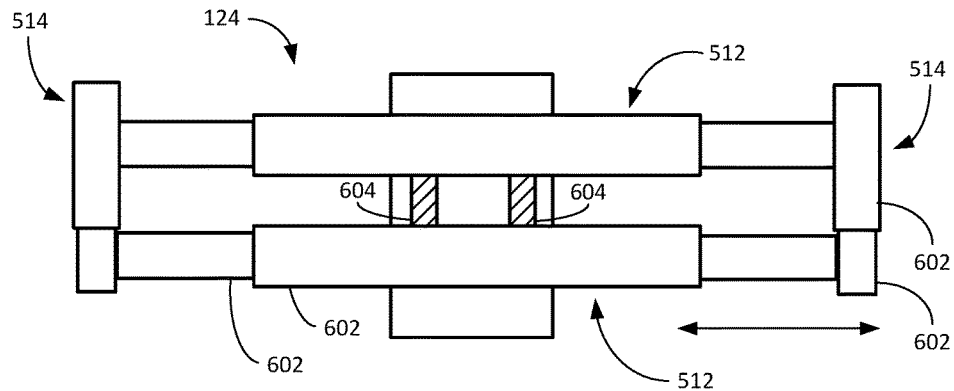
Figure 6C:
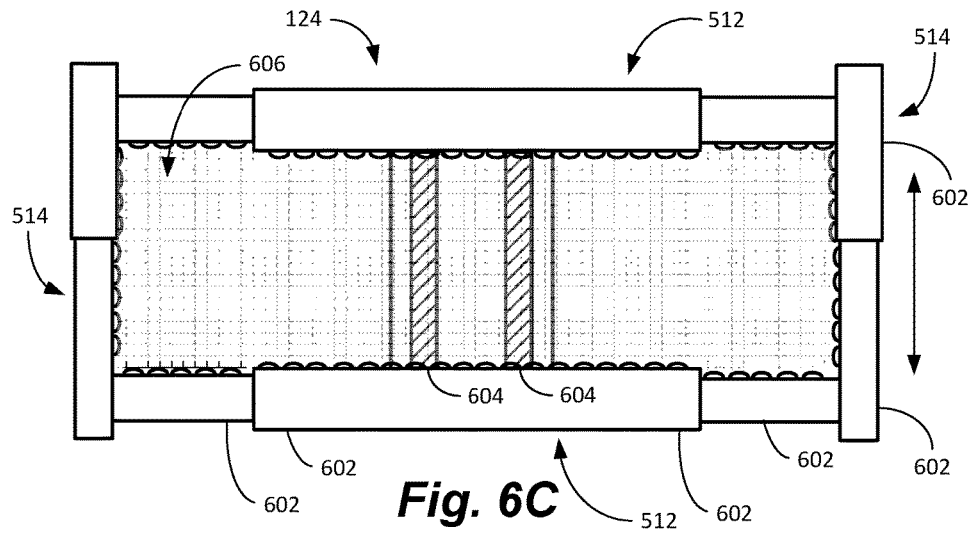

As shown in FIGS. 6A-6C, the end effector 124 can comprise a number of components to enable it to adjust its size. The end effector 124 can include one or more adjustable horizontal bars 512. In some examples, the horizontal bar 512 can comprise a first group of two or more telescoping sections 602. The telescoping sections 602 can be extended and retracted to accommodate various inventory items 104 and/or shelf 108 configurations. In some examples, the telescoping sections 602 can include one or more servo motors or linear actuators. In other examples, the telescoping sections 602 can use hydraulic or pneumatic pressure to move. The telescoping sections 602 can be moved between a first position, in which the telescoping sections are fully retracted (i.e., in their narrowest position) and a second positon, in which the telescoping sections 602 are fully deployed (i.e., in their widest position) and many positions in between the first position and the second position.

Similarly, the end effector 124 can include one or more adjustable vertical bars 514. In some examples, the vertical bar 514 can also comprise a second group of two or more telescoping sections 602. As before, the telescoping sections 602 can be extended and retracted to accommodate various inventory items 104 and/or shelf 108 configurations. In some examples, the telescoping sections 602 can include one or more servo motors or linear actuators. In other examples, the telescoping sections 602 can use hydraulic or pneumatic pressure to move. The telescoping sections 602 can be moved between a first position, in which the telescoping sections are fully retracted (i.e., in their shortest position) and a second positon, in which the telescoping sections 602 are fully deployed (i.e., in their tallest position).

In some examples, the horizontal bars 512, the vertical bars 514, or both can be mounted on one or more screw drives 604. The screw drives 604, in turn, can be mounted on the truck 504 and/or the control head 116. In this configuration, the control head 116 can include one or more additional motors (not shown) to turn the screw drives 604. The screw drives 604 can enable precise placement of the horizontal bars 512 and/or the vertical bars 514 to accommodate various shelves 108 and bays 502a. In other examples, the bars 512, 514 can be positioned using hydraulics, pneumatics, servo motors, linear actuators, or other suitable means.

As shown in FIG. 6A, in the fully retracted position, the end effector 124 can occupy a relatively small volume to enable easy maneuvering from shelf 108 to shelf 108, for example, or bay 502a to bay 502a. As shown in FIG. 6B, to adjust to various bay 502a or shelf 108 widths, the width of the horizontal bars 512 can be adjusted using the aforementioned pneumatic, hydraulic, or electrical means (e.g., the screw drives 604). In the retracted position, the end effector 124 can be positioned behind the shelving units 102 to enable it to traverse behind the shelves 108 to other shelves 108.

As shown in FIG. 6C, to adjust to various shelf 108 or inventory item 104 heights, the vertical bars 514 can be similarly adjusted. In some examples, the vertical bars 514 can simply be adjusted to substantially the same height as the shelf 108 (e.g., the distance between the current shelf 108 and the shelf above 108). In other examples, the vertical bars 514 can be adjusted based on the height of the inventory item 104. This can be achieved using one or more sensors on the end effector 124, for example, or based on known dimensions from an inventory database.

In some examples, the end effector 124 can also comprise a net 606, curtain, mesh, fabric, screen, sheet, or other device to present a substantially solid surface to the inventory item 104. Note that the net 606 is not shown in FIGS. 6A and 6B for clarity, but can be used in all positions. Thus, as shown, in some examples, the end effector 124 can comprise an elastic net 606 that enables the center of the end effector 124 to be substantially solid despite its position. In other examples, the net 606 could comprise a suitable elastic fabric, an accordion insert, or interlocking fingers, for example. One of skill in the art will recognize that a number of devices could be used to provide an expandable insert for the end effector 124 to facilitate moving inventory items 104 as discussed above.

Figure 7A:
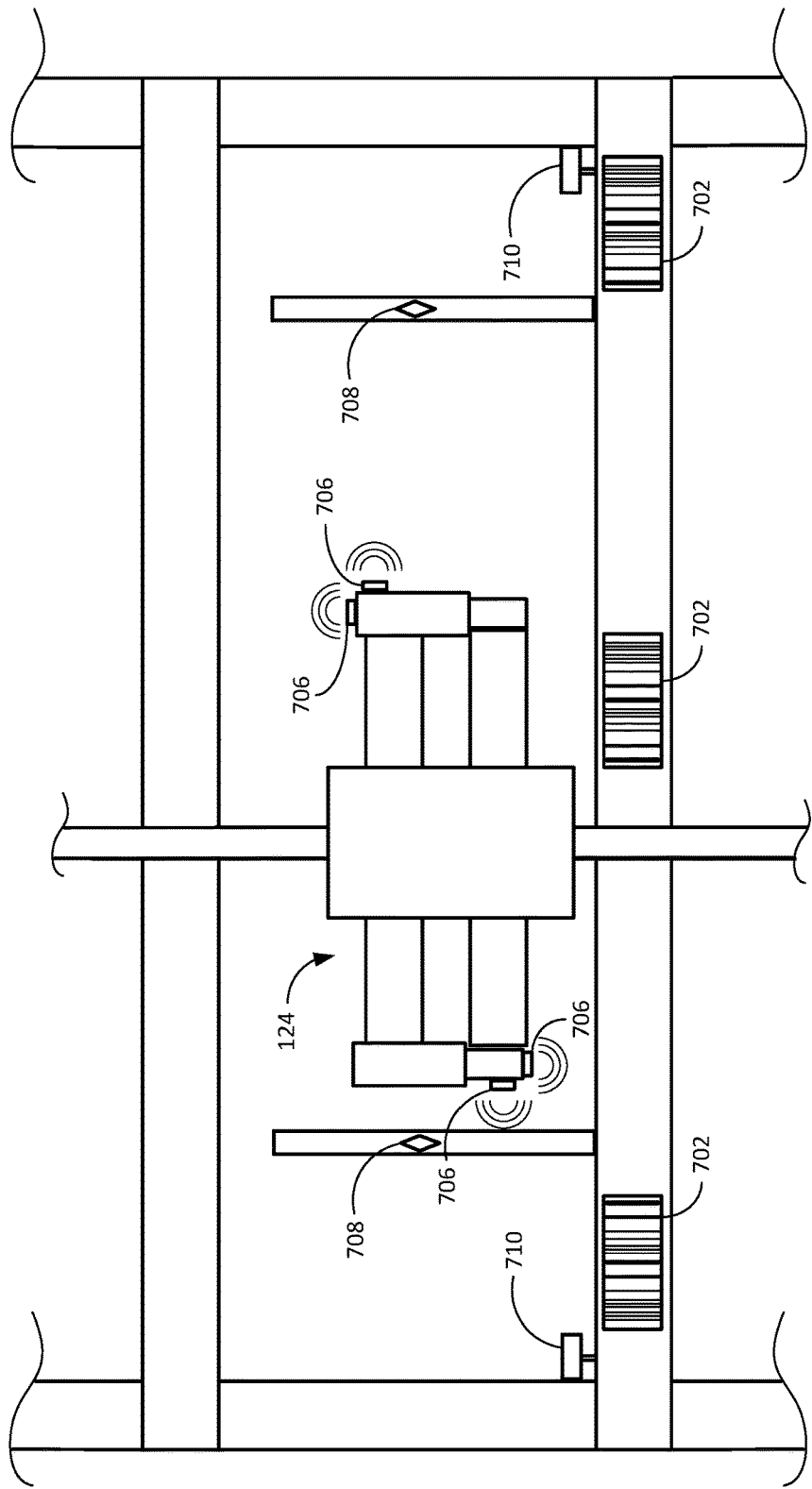
FIGS. 7A and 7B depict the back (FIG. 7A) and front (FIG. 7B) of the end effector and shelving unit with various sensors and labels, in accordance with some examples of the present disclosure.
Figure 7B:
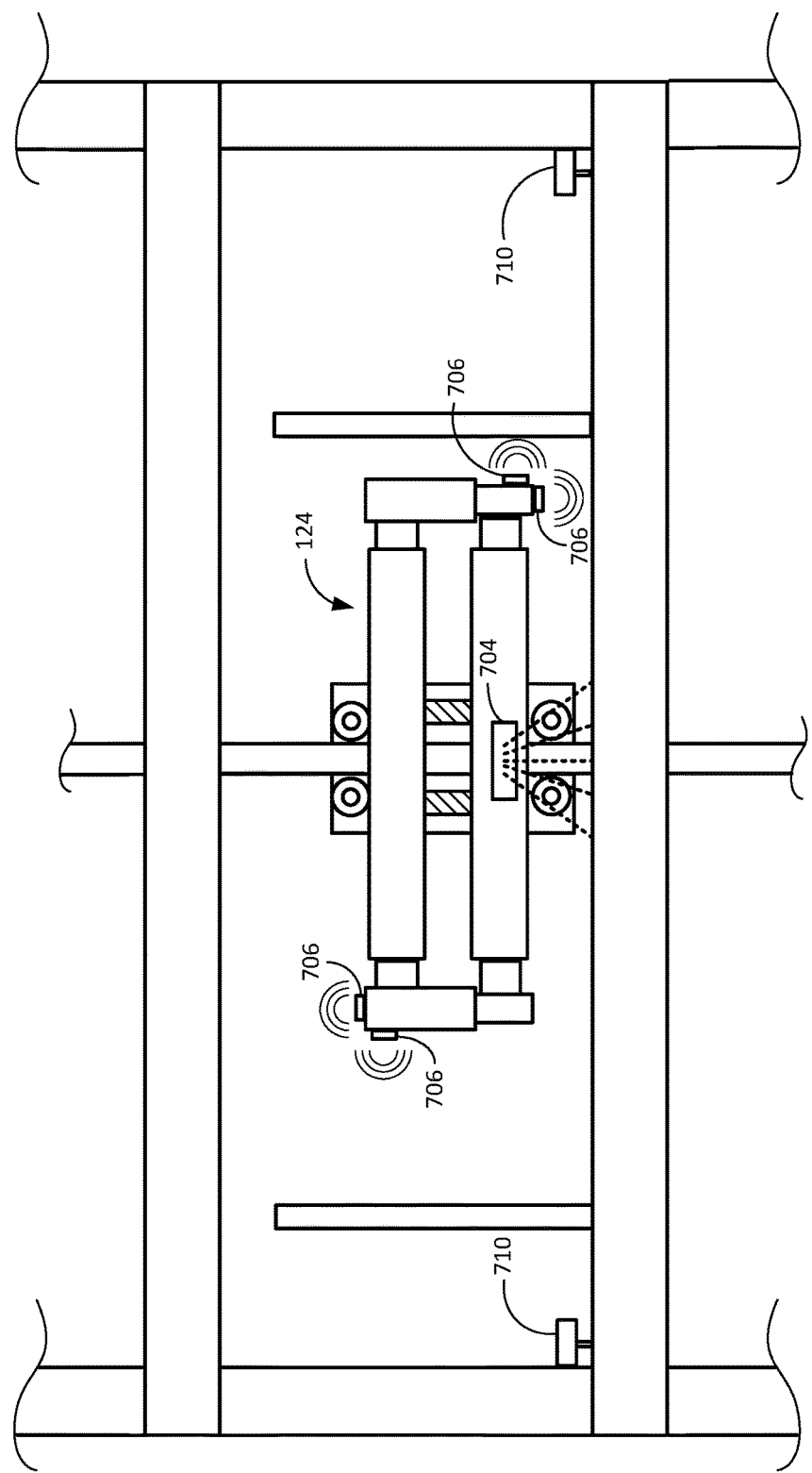

As shown in FIGS. 7A and 7B, the end effector 124 and shelving unit 102 can comprise a number of additional features to enable the RPS 106 to position itself on a particular inventory item 104. In some examples, each bay 502a and/or each shelf 108 can include a product label 702. The product label 702 can comprise, for example, a product name, 2D or 3D barcode, RFID tag, magnetic tag, pictogram, or Universal Product Code (UPC). In some examples, the control head 116 can comprise an imaging device 704 to enable it to read the product label 702 and other indicia on the shelf 108. The imaging device 704 can comprise, for example, a laser scanner, RFID reader, video or still camera, or magnetic reader.

In some examples, the imaging device 704 can comprise a video or still camera and can be used as part of the verification/quality control process. In other words, if the inventory control system 200 sends a command for the RPS 106 to reposition an inventory item 104, the RPS 106 can first use the imaging device 704 to determine (1) if the object or box is approximately the right size for the inventory item 104 and (2) if the object or box has any significant damage. If, for example, the imaging device 704 determines that the object or box in a particular bay 502*a* is clearly too small to be the requested inventory item 104, the RPS 106 could send an error message to the management module 202 to this effect.

Similarly, if the object or box for the inventory item 104 is damaged, e.g., a box that is clearly no longer rectangular (or its original shape), it may have been badly damaged during shipping or in the warehouse 208. In this case, the RPS 106 can also send an error message to the management module 202 indicating there may be a problem. In other examples, the RPS 106 can simply send a picture of the inventory item 104 to the management module 202 or a worker to determine that it is the correct inventory item 104 and that it is substantially undamaged. In some examples, a worker can be dispatched to determine if there is a problem. In other examples, the management module 202 may simply choose an inventory item 104 in a different location, or a suitable substitute.

In some examples, the control head 116 can also comprise one or more proximity sensors 706. The proximity sensors 706 can comprise, for example, laser, ultrasonic, or optical proximity sensors to enable the RPS 106 to detect the position of the end effector 124. The proximity sensors 706 can be used to detect the shelves 108 and/or vertical dividers 502 forming each bay 502*a*. This can enable the RPS 106 to position and/or expand the end effector 124 for various sized bays 502*a*.

In still other examples, the vertical dividers 502 can also comprise one or more fiducials 708. The fiducials 708 can comprise a bay location number, a 2D or 3D barcode, an RFID tag, magnetic tag, pictogram, or reflective tape, among other things. As discussed below, the RPS 106 can use the fiducials 708 to position and/or expand the end effector 124 for various sized bays 502*a*. In some examples, the imaging device 704 can be used to locate and identify any of the indicia (e.g., the vertical dividers 502, product labels 702, or fiducials 708) on the shelf 108 to enable the RPS 106 to position itself and perform other operations. In some examples, the shelf 108 can comprise one or more position sensors 710. The position sensors 710 can comprise, for example, a light beam, scale, or other device to detect the location of the inventory item 104 on the shelf 108. In some examples, the position sensor(s) 710 can be placed proximate the edge of the shelf 108 to enable the RPS 106 to detect when the inventory item 104 has been moved to the desired location. In some examples, the RPS 106 can also use the position sensor(s) 710 to detect when the inventory item 104 has fallen off the shelf 108 (e.g., when using a robot 204 to retrieve inventory items 104 from the shelving unit 102).

Figure 8A:
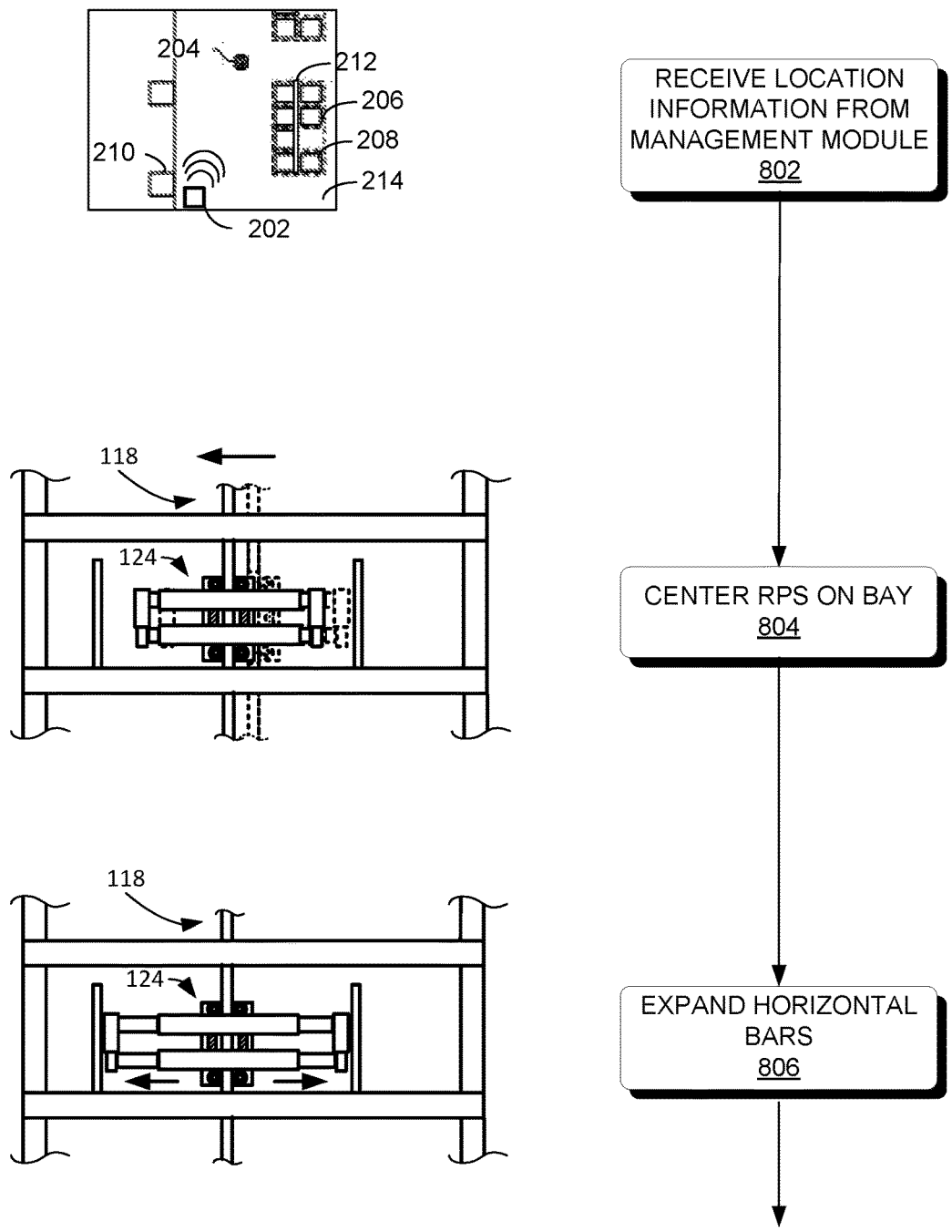
FIGS. 8A and 8B are flowcharts depicting the end effector expanding and repositioning an inventory item onto a robot, in accordance with some examples of the present disclosure.
Figure 8B:
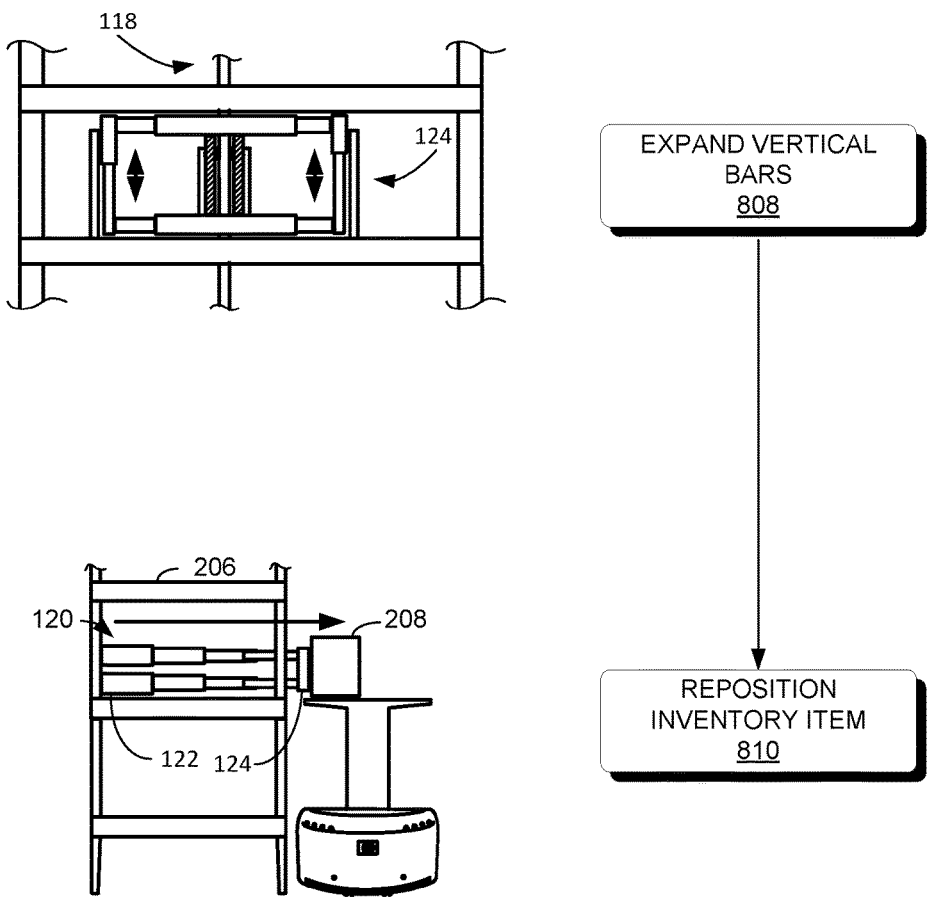

As shown in FIGS. 8A and 8B, examples of the present disclosure can also comprise a method 800 for positioning the RPS 106 on an inventory item 104. At 802, the RPS 106 can receive the inventory item 104 location from the management module 202. As discussed above, this can be in the form of a shelving unit 102 location or number, a shelf 108 number, a bay 502*a* number, or other suitable means.

At 804, based on this information, the RPS 106 can move to a positon proximate the inventory item 104. In some examples, the RPS 106 can position itself based on an X-Y coordinate positioning system, for example, or based on the shelving unit 102 number, shelf 108 number, or bay 502*a* number. In some examples, the RPS 106 can use the product labels 702, proximity sensors 706, fiducials 708, and/or other means to locate and/or verify correct placement.

At 804, the RPS 106 can also center the end effector 124 on the correct bay 502*a*. In some examples, the end effector 124 can use the proximity sensors 706 to locate the approximate vertical and horizontal center of the bay 502*a* or inventory item 104. The proximity sensors 706 can sense the distance from the end effector 124 to the vertical dividers 502 and/or from the end effector 124 to the shelves 108 immediately above and below the inventory item 104. In some examples, the location information from the management module 202 may be precise enough for central placement of the end effector 124. In other examples, the location information can include size and/or shape information for the inventory items 104.

At 806, the end effector 124 can expand the horizontal bars 512 to the approximate width of the bay 502*a*. The end effector 124 may maintain a predetermined distance (e.g., ½") from the vertical dividers 502, for example, to avoid moving the vertical dividers 502 and to reduce drag. In other embodiments, the vertical dividers 502 can be fixed to the shelf 108 and the end effector 124 can simply expand until the horizontal bars 512 (or the vertical bars 514 depending on configuration) touch the vertical dividers 502. In some examples, the horizontal bars 512 (or vertical bars 514) contacting the vertical dividers 502 can be detected by an increase in resistance experienced by the motors or actuators, or an increase in noise from the motors that expand the horizontal bars 512, similar to an automatic window system in a vehicle. The horizontal bars 512 may then retract slightly, as discussed above.

At 808, the end effector 124 can expand the vertical bars 514 to the approximate height of the bay 502*a*. In some examples, the end effector 124 can maintain a predetermined distance (e.g., ½") from the shelf above and below the inventory item 104. In other embodiments, the end effector 124 can simply expand until the vertical bars 514 touch one or both shelves 108 (i.e., the shelf 108 for the inventory item 104 and the shelf 108 above). As above, in some examples, the vertical bars 514 contacting the shelves 108 can be detected by an increase in resistance experienced by the motors or actuators, or an increase in noise from the motors that expand the vertical bars 514.

At 810, the RPS 106 can activate the extender 122 to reposition the inventory item 104 to the edge, or off, of the shelf 108. In some examples, as shown, the inventory item 104 can be pushed onto a waiting robot 204. In other examples, the inventory item 104 can be repositioned to the edge, or just over the edge, of the shelf 108 to enable easy identification and retrieval.

As shown in FIGS. 9A and 9B, the end effector 124 and extender 122 can take several forms. In some examples, as shown in FIG. 9A, the extender 122 can comprise a plurality of telescoping segments 902 and the end effector 124 can comprise a simple push plate 904. In other examples, the extender 122 can further include a linear actuator, servo motor, or rack and pinion system, for example, with or without the telescoping segments 902. In other examples, the telescoping segments 902 can be operated using a hydraulic or pneumatic system. In other words, the end effector 124, or control head 116, can include a hydraulic or pneumatic pump or a hydraulic or pneumatic connection to enable the telescoping segments 902 to be moved in and out.

As shown in FIG. 9B, in some examples, the extender 122 can comprise a folding arm 906 and the end effector 124 can comprise a push plate 904. In some examples, each joint of the folding arm 906 can comprise a servo motor 908, or other device, for positioning the arm segments 910. In some examples, the arm segments 910 can be controlled individually to enable the folding arm 906 to assume many shapes. This may be useful to maneuver in tight bays 502a, for example, or to move small inventory items 104 or the vertical dividers 502. In other examples, the arm segments 910 can be controlled in concert, such that each of the folding arms 906 folds and unfolds evenly and/or proportionately. This may reduce the complexity of the control system for the folding arm 906 and can increase the pushing power of the folding arm 906 because all of the motors 908 are working together. In some examples, rather than folding, the extender 122 can comprise a scissor mechanism. In this manner, a single control rod or cable can be used to move the extender in and out. To this end, as discussed above, in some examples, the end effector 124 can comprise a simple push plate 904 (i.e., a non-articulating plate for simplicity).

In some examples, the RPS 106 can also comprise a means for detecting, or estimating, the weight of an inventory item 104. In some examples, such as when the robot 204 is used to deliver the inventory item 104, the robot's lift mechanism can include a weight sensor (e.g., a strain gauge or other scale). In other examples, as shown in FIG. 9A, the shelf 108 can include a weight plate 912 (e.g., an electronic scale or strain gauge). In still other embodiments, the RPS 106 can monitor the energy required to push the inventory item 104 on the shelf 108. In other words, based on the estimated coefficient of friction between an object or box and the shelf 108 material, for example, and the current draw of the extender 122 motors 908, the weight of the inventory item 104 can at least be estimated.

Regardless of the method used, comparing the known weight of the inventory item 104 to the approximate weight measured by the RPS 106, for example, can provide another check as to whether the correct inventory item 104 is being retrieved. If the weight plate 912 or RPS 106 detects that the inventory item 104 is significantly heavier or lighter than expected, then the RPS 106 can send an error message to the management module 202 to this effect. Again, this can enable the management module 202 to react as necessary to locate the correct inventory item 104. The configuration of the RPS 106 can also take on many forms depending on the type of warehouse 208 or shelving units 102, among other things.

Figure 10A:
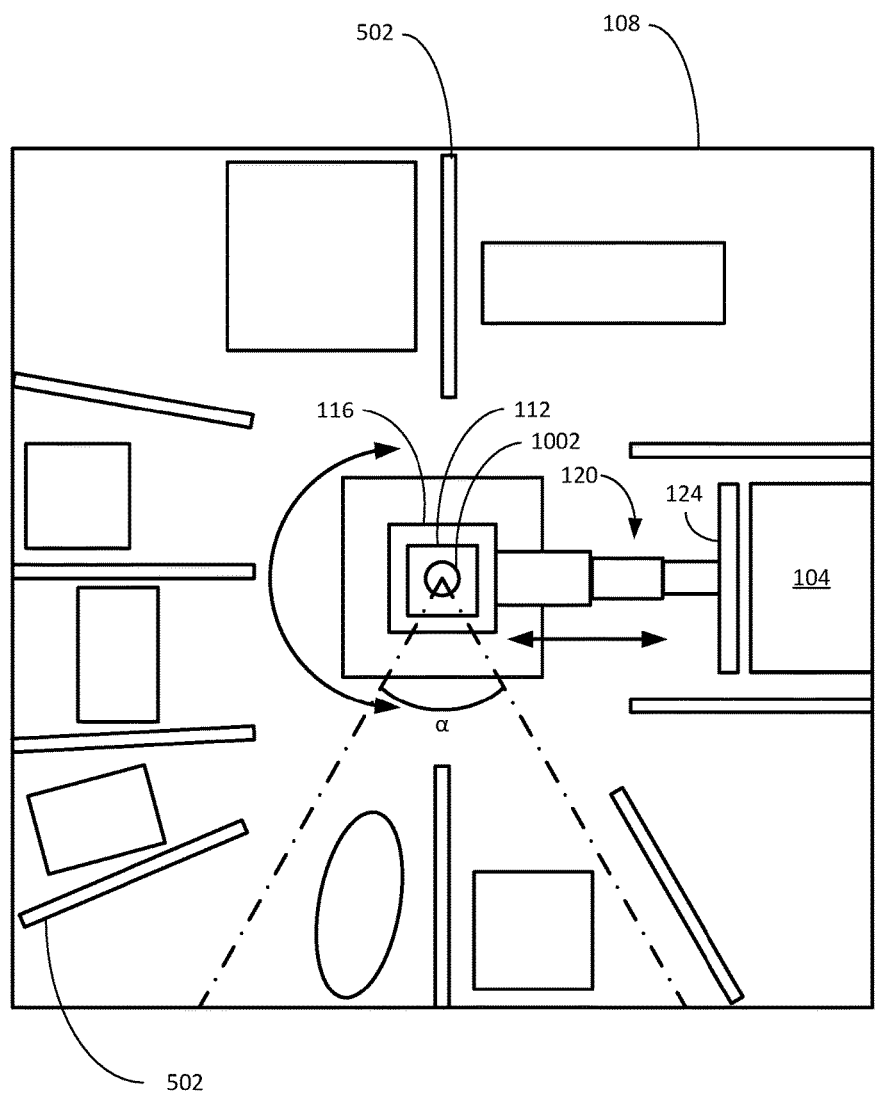
FIG. 10A is a top view of a rotating RPS on a square shelving unit, in accordance with some examples of the present disclosure.

As shown in FIG. 10A, in some examples, the shelving unit 102 can be four sided to enable inventory items 104 to be removed from all four sides of the shelving unit In this configuration, rather than traversing along an X-Y coordinate system and pushing along the Z-axis, as discussed above, the control head 116 can rotate and traverse along the Y-axis and push in any direction in the X-Z plane. In other words, the control head 116 can move up and down (i.e., along the Y-axis) along the vertical track 112 to move from shelf 108 to shelf 108. A rotational actuator 1002 can rotate the control head 116 and/or vertical track 112 through 360 degrees or more about the Y-axis to position the end effector 124 on the desired inventory item 104. The end effector 124 can then reposition the inventory item 104 from its current position radially outward toward the edge of the shelf 108.

In some examples, the inventory items 104 can be placed within a predetermined angular range, α. This can prevent overlap of inventory items 104 in the corners of each shelf 108. This can also maintain a relatively small angle of incidence between the end effector 124 and the inventory item 104. This configuration can enable radial operation on a square or rectangular shelving unit 102 with only minor loss of storage space.

Figure 10B:
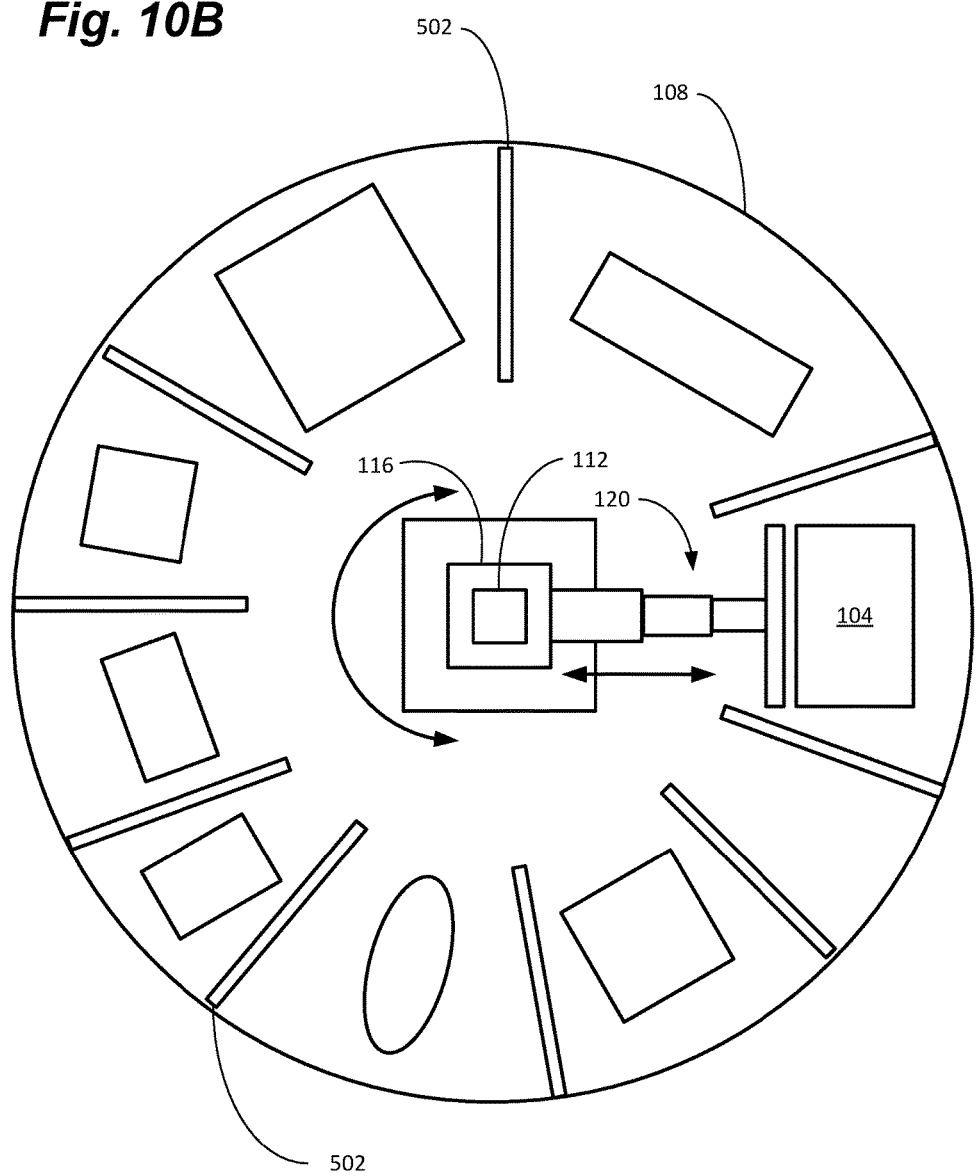
FIG. 10B is a top view of a rotating RPS on a round shelving unit, in accordance with some examples of the present disclosure.

In other examples, as shown in FIG. 10B, the shelving unit 102 can be round to take advantage of the radial nature of the RPS 106. In some examples, the vertical dividers 502 can be placed around the shelf 108 in a radial manner to divide each shelf 108 into pie shaped bays 502a. This can enable storage around substantially the entire circumference of the shelf 108. This configuration can enable the RPS 106 to be relatively simple and inexpensive as it uses the vertical track 112 for both vertical and radial positioning, among other things.

Figure 11:
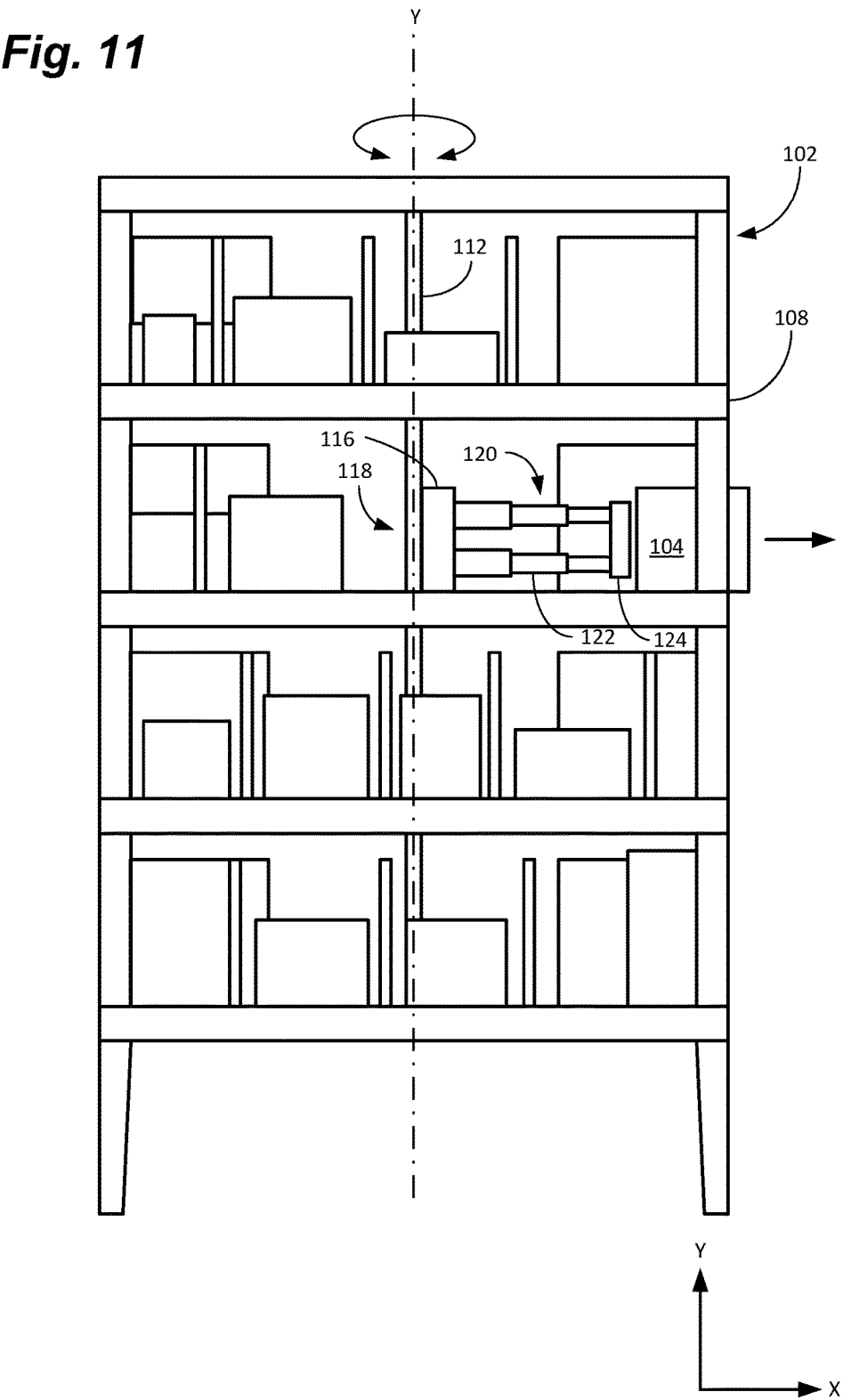
FIG. 11 is a side view of the rotating RPS repositioning an inventory item, in accordance with some examples of the present disclosure

As shown in FIG. 11, therefore, the RPS 106 can be placed substantially in the center of the shelving unit 102 and can rotate about the Y-axis. In this manner, the end effector 124 can be positioned through 360 degrees or more to reposition inventory items 104 to be accessible on all four sides of the shelving unit 102. In the case of the round shelving unit 102 shown in FIG. 10B, the RPS 106 can reposition inventory items 104 substantially radially at any angle along 360 degrees. In some examples, as shown, the vertical dividers 502 can be placed in a radial pattern to facilitate access for the end effector 124.

Once in place behind the inventory item 104, the extender 122 and/or end effector 124 can extend along any radial line in the X-Z plane to reposition the inventory item 104 to the respective one of the four edges (FIG. 10A) or to the edge of the circular shelving unit 102 (FIG. 10B). As before, in some examples, the end effector 124 can push the inventory item 104 off the edge of the shelf 108 to a waiting robot 204, cart, platform, conveyor, ramp, slide, chute, bin, container, or other device.

Figure 12A:
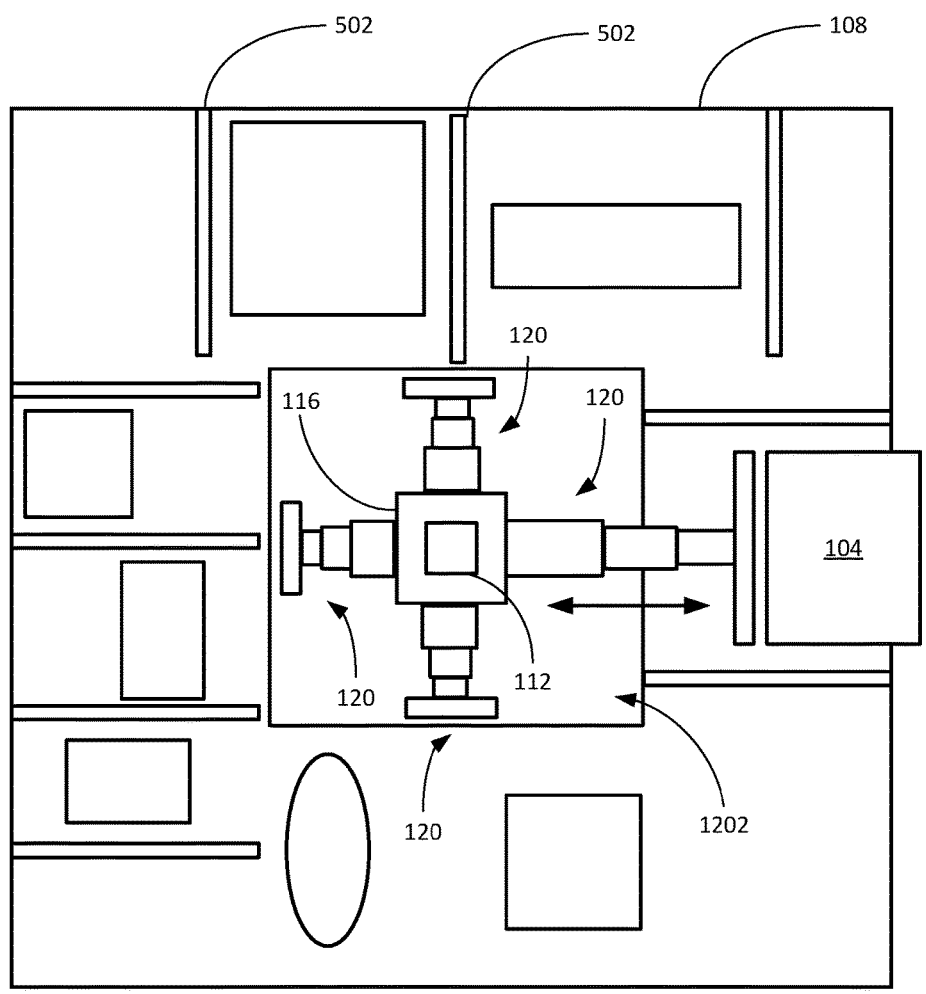
FIG. 12A is a top view of a four sided RPS, in accordance with some examples of the present disclosure.

In other examples, as shown in FIG. 12A, the RPS 106 can again be placed in a substantially central location of the shelving unit 102. In this configuration, however, the control head 116 can comprise four positioners 120, one for each direction on the shelf 108. In this manner, the control head 116 can simply reposition vertically to the correct shelf 108 and then activate the appropriate positioner 120 depending on the location of the inventory item 104. The RPS 106 can reposition the inventory item 104 in all four directions enabling a four-sided shelving unit 102. This can reduce the number of RPSs 106 and shelving unit 102 in the warehouse 208 by utilizing all four sides of each shelf 108.

Figure 12B:
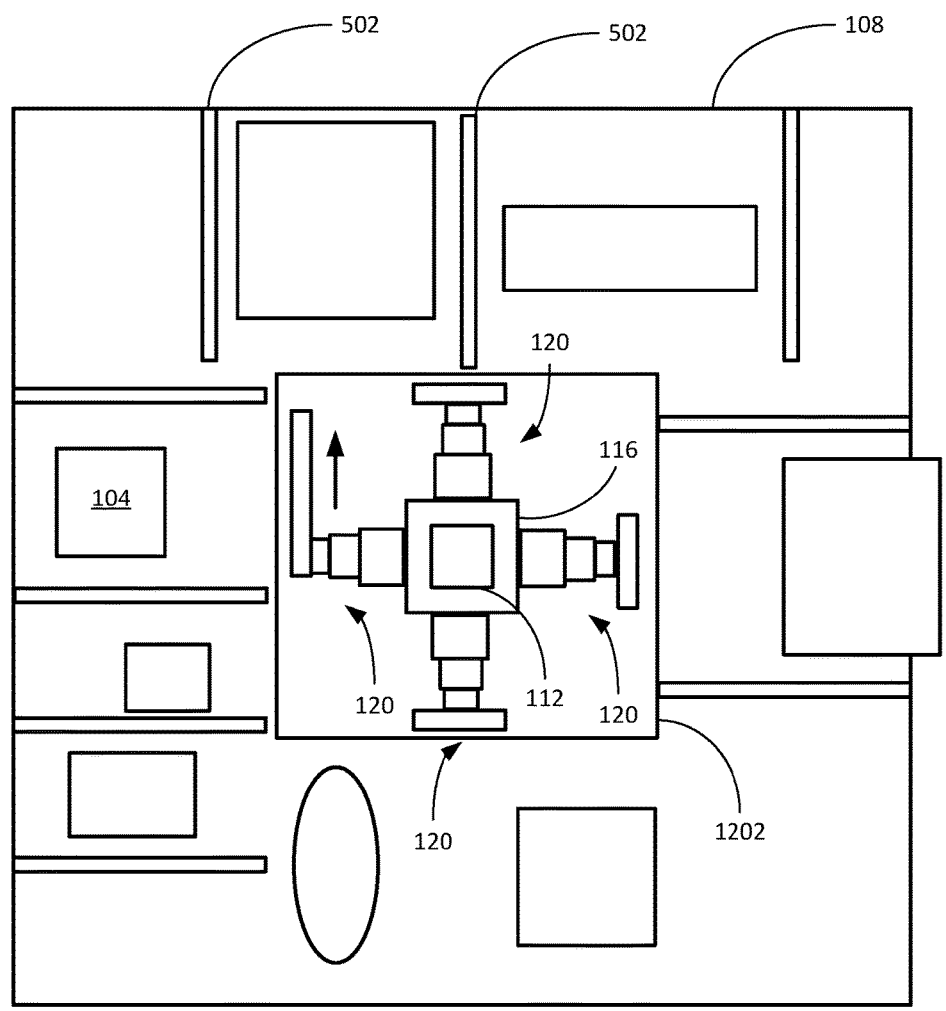
FIG. 12B is a top view of a four sided RPS with a sliding end effector, in accordance with some examples of the present disclosure.

Of course, in its simplest form, this configuration may enable only four inventory items 104 to be stored on each shelf 108. In other words, if the vertical track 112 is fixed, the positioners 120 will essentially only be centered on one inventory item 104 in each direction. To this end, as shown in FIG. 12B, in some examples, the end effector 124 or push plate 904 can be repositionable to a position that is offset from the extender 122. In this configuration, if an inventory item 104 is positioned slightly to one side of the center of the shelving unit 102, the push plate 904, for example, can move in either direction to center on the inventory item 104. Thus, the push plate 904 can move from side to side, while the extender 122 remains fixed with respect to the control head 116. This configuration can enable the push plate 904 to substantially center itself on several inventory items 104 on the same shelf 108, despite their disparate placement.

In other examples, the end effector 124 can be used asymmetrically to position itself on inventory items 104 that are slightly off center. In other words, if an inventory item 104 is off center from the extender 122, one side or the other of the end effector 124 can extend to create an asymmetrical pushing surface with respect to the extender 122. Again, this can enable the positioner 120 to center the end effector 124 on inventory items 104 despite the inventory items 104 being off center on the shelf 108.

Figure 12C:
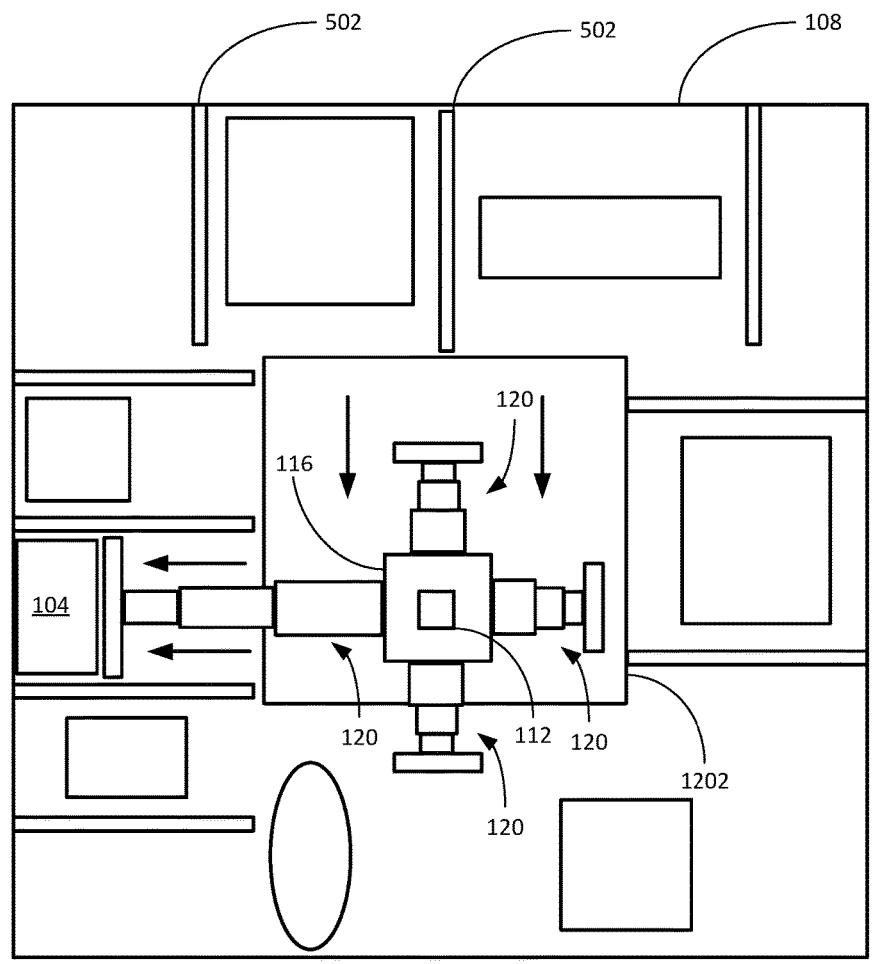
FIG. 12C is a top view of a four sided RPS with a movable vertical track, in accordance with some examples of the present disclosure.

In other examples, as shown in FIG. 12C, the vertical track 112 may be repositionable within the confines of the opening 1202 of the shelving unit 102. In other words, the vertical track 112 can be moved slightly along the X- or Z-axis to reposition the end effector 124. As above, this configuration can enable the end effector 124 or push plate 904 to substantially center itself on several inventory items 104 on the same shelf 108.

Figure 13:
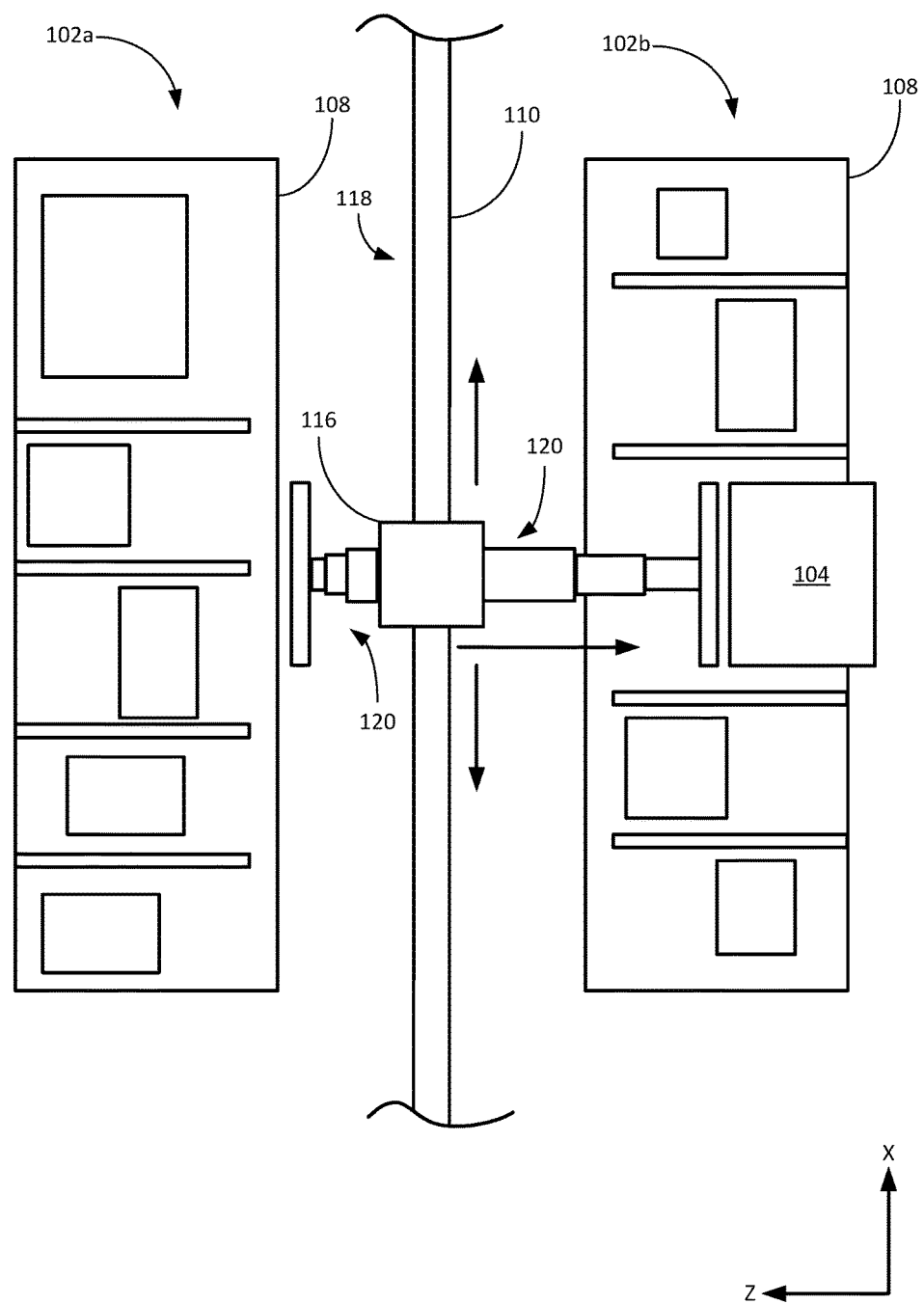
FIG. 13 is a top view of a two sided RPS disposed between two shelving units, in accordance with some examples of the present disclosure.

As shown in FIG. 13, in still other examples, and as discussed above with reference to FIG. 1, the RPS 106 can be positioned "behind" two or more sets 102a, 102b of shelving units 102. In this configuration, the RPS 106 can comprise a control head 116 mounted on a vertical track 112 for movement up and down, or in the Y-axis. The vertical track 112, in turn can be mounted on a horizontal track 110 for movement back and forth, e.g., in the X-axis or Z-axis depending on the orientation. Of course, this configuration is somewhat arbitrary, and the opposite could also be true—i.e., the control head 116 could be mounted on the horizontal track 110, which could, in turn, be mounted on the vertical track 112.

As shown, in some examples, the control head 116 can include two positioners 120, one for each set 102a, 102b of shelving units 102. In this manner, the RPS 106 can reposition inventory items 104 on either or both shelving units 102. In other examples, the RPS 106 can comprise a single positioner 120 capable of movement in either direction (e.g., towards either set 102a, 102b of shelving units 102). In still other examples, the RPS 106 can comprise a single rotating positioner 120 repositionable between the first set 102a of shelving units 102 and the second set 102b of shelving units 102.

In some examples, the horizontal track 110 and the vertical track 112 can comprise a free-standing frame 114. In this configuration, the free-standing frame 114 can be placed between two or more sets 102a, 102b of outwardly facing shelving units 102, for example, with access to each shelf 108 from behind the shelving unit 102. In this manner, a single RPS 106 can access a plurality of shelving units 102 with a single control head 116, for example. Thus, if each set 102a, 102b of shelving units 102 comprises five shelving units 102, a single RPS 106 can access ten shelving units 102. This can reduce the cost of the RPS 106 on a per shelving unit 102 basis and enable a single, or a few, RPSs 106 to service even large warehouses 208. In addition, because the shelving units 102 and RPS 106 are separate components, the shelving units 102 can be moved independently of the RPS 106. This can enable the robots 204 to move the shelving units 102, as discussed above, e.g., to and/or from the RPSs 106.

Figure 14A:
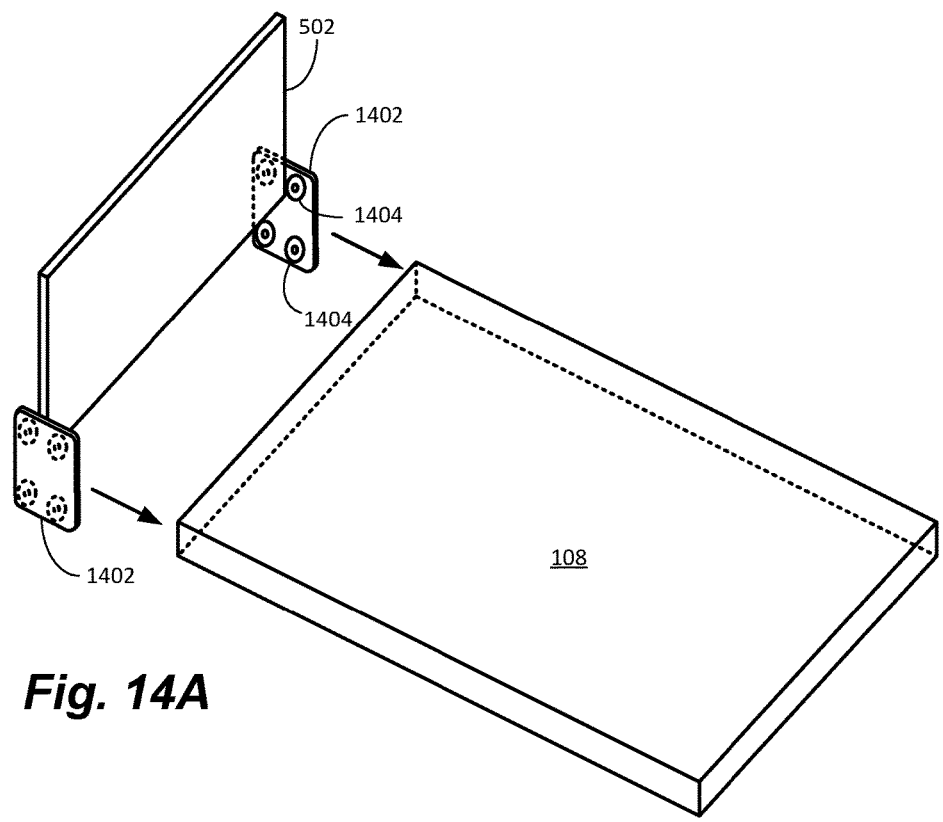
FIGS. 14A and 14B are isometric views of a vertical divider with a vertical truck before and after installation on a shelf, respectively, in accordance with some examples of the present disclosure.
Figure 14B:
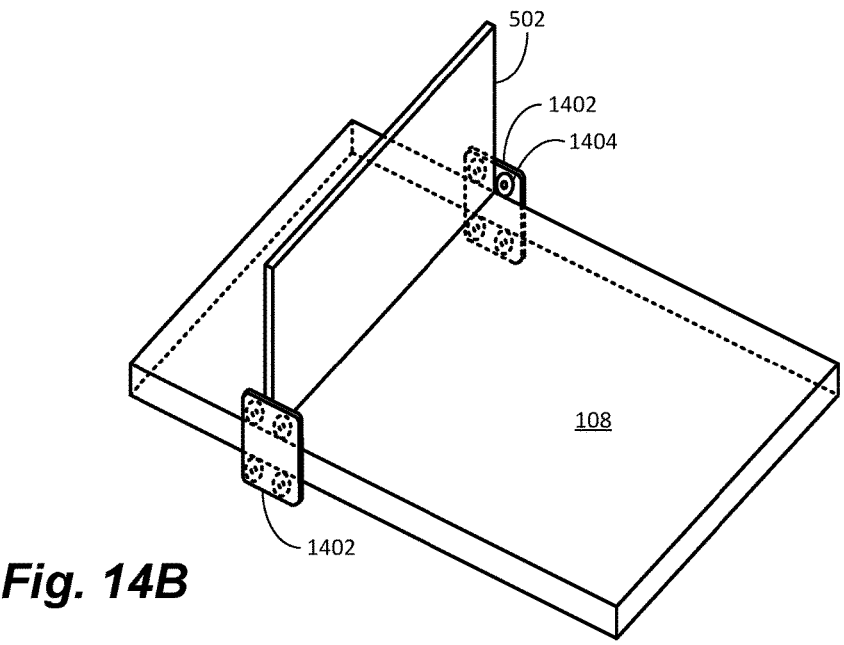

In some examples, as shown in FIGS. 14A and 14B, the vertical dividers 502 can form an integral part of the inventory control system 200. As described above, the vertical dividers 502 can be repositionable from side-to-side on the shelf 108. This combined with the distance between each shelf 108, which can also be adjustable, can enable various sized bays 502a to be created for various sized inventory items 104.

The bays 502a can be useful in several ways. The bays 502a can enable each shelving unit 102 to be fully utilized, for example, by enabling the shelving unit 102 to be densely stocked, while still maintaining good organization. In addition, the vertical dividers 502 along with the various labeling elements (e.g., the product label 702 and fiducials 708) discussed above, can enable the RPS 106 to locate and position itself on each bay 502a to reposition inventory items 104, as needed. In some examples, one or more of the labeling elements can be centered on each bay 502a. In the manner, the RPS 106 can use the labeling elements to center the end effector 124 on the bay 502a.

As shown, the vertical dividers 502 can comprise one or more vertical trucks 1402 each comprising one or more alignment wheels 1404. In some examples, as shown, the alignment wheels 1404 can be sized and shaped to fit over the edge of the shelf 108 to enable the vertical divider 502 to be moved back and forth to adjust the width of the bay 502a. In other examples, the alignment wheels 1404 can be sized and shaped to fit over a track or bar (not shown) mounted on the shelf 108 for this purpose. As the name implies, the alignment wheels 1404 can maintain the substantially vertical alignment of the vertical divider 502. This reduces, or eliminates, the tendency of the vertical divider 502 to fall over when pushed above or below its center of gravity, for example. In some examples, the vertical trucks 1402 can be spring-loaded to maintain the vertical positioning of the vertical dividers 502.

Figure 15A:
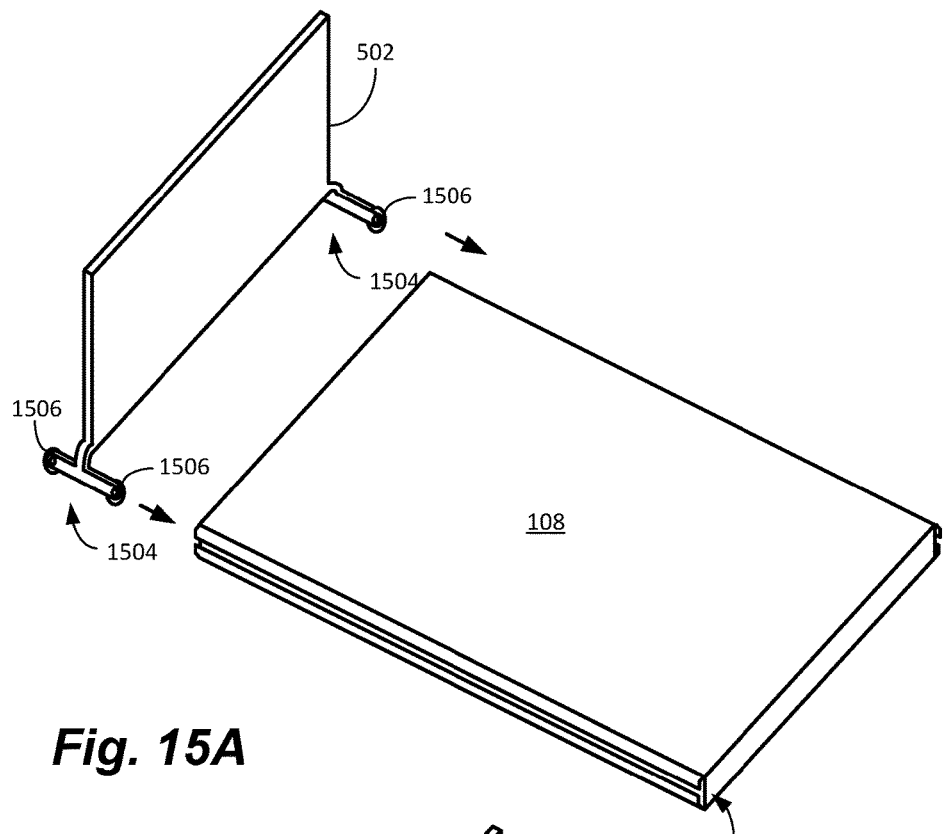
FIGS. 15A and 15B are isometric views of a vertical divider with a horizontal truck before and after installation on a shelf, respectively, in accordance with some examples of the present disclosure.
Figure 15B:
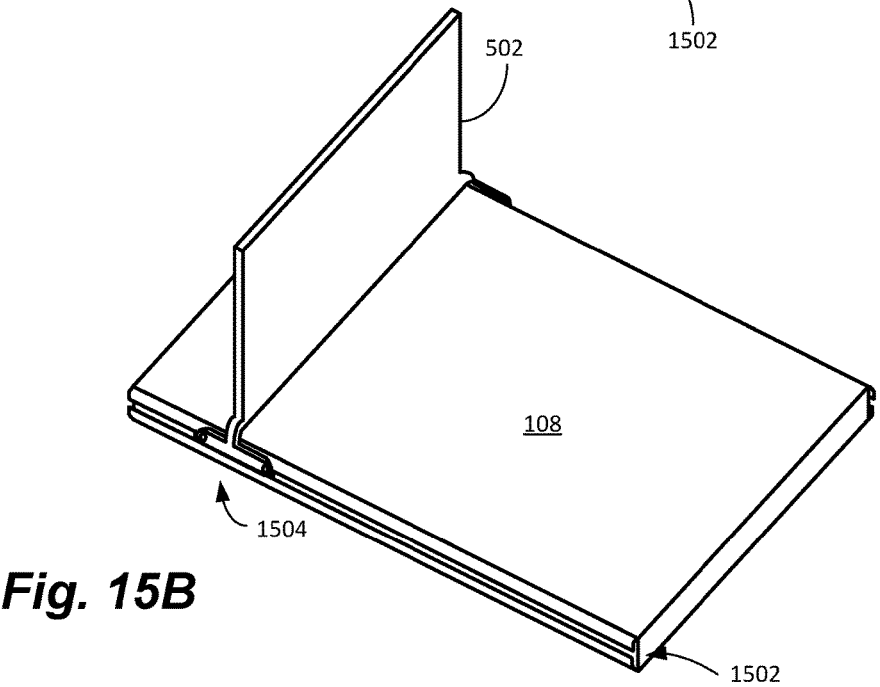

As shown in FIGS. 15A and 15B, in other examples, the shelf 108 can comprise one or more channels 1502 and one or more horizontal trucks 1504. In some examples, the channels 1502 can be formed into or attached to the edge of the shelf 108. The channels 1502 can be, for example, screwed, bolted, welded, or glued to the shelving unit 102. The horizontal trucks 1504 can comprise two or more alignment wheels 1506 sized and shaped to fit inside the channel 1502. As above, the alignment wheels 1506 can enable the vertical divider 502 to be repositioned without falling over.

Thus, regardless of the configuration, the trucks 1402, 1504 can enable the vertical dividers 502 to be moved back and forth without falling over. This can enable the RPS 106 to autonomously reposition the vertical dividers 502 when necessary. In this manner, the RPS 106 can position the positioner 120 next to a vertical divider 502 and simply traverse in the appropriate direction along the horizontal track 110 to reposition the vertical divider 502 on the shelf 108.

In some examples, the trucks 1402, 1504 and/or the alignment wheels 1404, 1506 can provide a predetermined amount of resistance to movement (e.g., 5 lbs.). In this manner, the RPS 106 can position the end effector 124 using the vertical dividers 502 without moving the vertical dividers 502. In other words, when the RPS 106 (e.g., the end effector 124) senses a first, predetermined resistance force against the vertical divider 502, it knows that it has reached the edge of the bay 502a, for example, or sufficiently widened the horizontal bars 512. If the RPS 106 actually wants to move the vertical divider, on the other hand, the RPS 106 can push against the vertical divider 502 with a second predetermined force that is greater than the first predetermined force. In this manner, the vertical dividers 502 are not unintentionally moved when the RPS 106 is simply centering itself on a bay 502a, for example, but can be automatically repositioned as necessary by the RPS 106.

Figure 16:
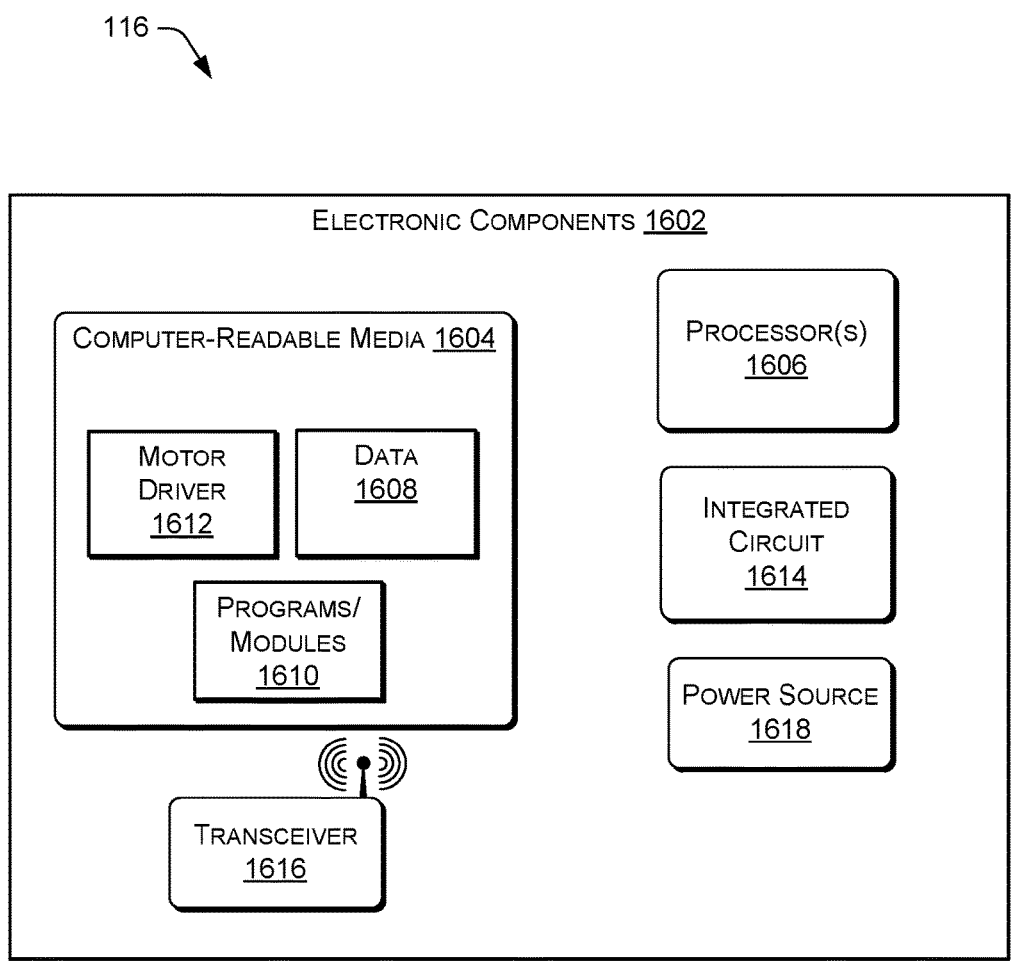
FIG. 16 is a schematic diagram of the control head, in accordance with some examples of the present disclosure.

As shown in FIG. 16, the control head 116 can comprise a number of components to enable the RPS 106 to communicate and move. The control head 116 can comprise, for example, various computing devices that each includes a power source and an output mechanism, such as a motor controller. As illustrated, the control head 116 includes various components 1602. In some embodiments, the components 1602 include computer-readable media 1604 and one or more processor(s) 1606. The processor(s) 1606 interact with the computer-readable media 1604 to execute instructions and facilitate operation of the control head 116.

The computer-readable media 1604, meanwhile, may be used to store data 1608, such as location or inventory information, motor positioning programming, communications protocols between the control head 116, management module 202, and/or robots 204, or the like. The computer-readable media 1604 may also include software programs or other executable modules 1610 that may be executed by the processor(s) 1606. Examples of such programs or modules include indexing modules for indexing data, reader programs, control modules (e.g., power management), network connection software, an operating system, sensor algorithms, and so forth.

The computer-readable media 1604 may include volatile memory (such as RAM), nonvolatile memory, removable memory, and/or non-removable memory, implemented in any method or technology for storage of information, such as computer-readable instructions, data structures, program modules, or other data. Also, the processor(s) 1606 may include onboard memory in addition to or instead of the memory 1604. Some examples of storage media that may be included in the computer-readable media 1604 and/or processor(s) 1606 include, but are not limited to, random access memory (RAM), read only memory (ROM), electrically erasable programmable read only memory (EEPROM), flash memory or other memory technology, compact disk (CD-ROM), digital versatile disks (DVD) or other optical storage, magnetic cassettes, magnetic tape, magnetic disk storage or other magnetic storage devices, or any other medium which can be used to store the desired information and which can be accessed by the control head 116. Any such computer-readable media may be part of the control head 116.

The computer-readable media 1604 may also store component drivers that include instructions that, when executed by the processor(s), are used to control the various components 1602. In accordance with one or more embodiments, the computer-readable media 1604 may include a motor driver 1612 that may be used to move the actuators 506, 508. In some examples, the control head 116 can also include one or more integrated circuits (IC) 1614 that are connected to the actuators 506, 508, sensors, or other components to provide feedback and control. The motor driver 1612 may process the signals and provide an output, such as a coordinate, a measured force value, a velocity, an acceleration, and/or other outputs.

In some embodiments, the IC 1614 may directly measure changes in electrical fields caused by sensors (e.g., proximity sensors 706) and/or noise or position information from the actuators 506, 508 to determine a coordinate, a measured force value, a velocity, an acceleration, and/or other outputs, and provide outputs to the processor(s) 1606, possibly without use of a driver.

The control head 116 can also comprise a power source 1618. In some examples, the power source 1618 can comprise a battery or capacitor, for example, to enable wireless powering of the RPS 106. In other examples, the power source 1618 can comprise wired, or "mains," power to the RPS 106. In some examples, the IC 1614 may be coupled to the power source 1618. The IC 1614 may manage power input into the actuators 506, 508 to cause the actuators 506, 508 to move and stop based on position information, for example.

The control head 116 can also include one or more transceivers 1616 to enable the control head 116 to communicate with the management module 202 and/or the robots 204. In some examples, the transceiver(s) 1616 can comprise RF transceivers for communicating using 802.11X, Bluetooth, or other wireless communications. In other examples, the transceivers 1616 can enable Ethernet, or other wired, communication with the other components.

While several possible examples are disclosed above, examples of the present disclosure are not so limited. For instance, while a system for repositioning inventory items in a warehouse is disclosed, the system could be used in other environments without departing from the spirit of the disclosure. In addition, the location and configuration used for various features of examples of the present disclosure such as, for example, the location and configuration of the shelving units, robots, and the layout of the warehouse can be varied according to a particular warehouse, inventory, or robot that requires a slight variation due to, for example, size or construction covenants, the type of robot required, or weight or power constraints. Such changes are intended to be embraced within the scope of this disclosure.

The specific configurations, choice of materials, and the size and shape of various elements can be varied according to particular design specifications or constraints requiring a device, system, or method constructed according to the principles of this disclosure. Such changes are intended to be embraced within the scope of this disclosure. The presently disclosed examples, therefore, are considered in all respects to be illustrative and not restrictive. The scope of the disclosure is indicated by the appended claims, rather than the foregoing description, and all changes that come within the meaning and range of equivalents thereof are intended to be embraced therein.

What is claimed is:

1. A system comprising:
    a management module to receive orders for a plurality of inventory items stored in the system and to direct one or more components of the system to reposition and retrieve the plurality of inventory items;
    one or more shelving units, a shelving unit of the one or more shelving units comprising a proximity sensor and a plurality of shelves for storing the plurality of inventory items;
    a robotic positioning system (RPS), disposed proximate to the one or more shelving units, the RPS comprising:
        a locating system to move the RPS in at least one direction relative to a shelving unit;
        an end effector adjustable in both width and height, the end effector comprising horizontally extendible bars to adjust the width and vertically extendible bars to adjust the height, and
        an extender to move the end effector between a retracted position and an extended position to move an inventory item on a shelf of the shelving unit from a rearward position on the shelf to a forward position on the shelf,
        wherein the RPS is responsive to the proximity sensor to determine that the inventory item is proximate to a front edge of the shelf; and
    a robot unit to move at least one of the inventory item, the shelving unit, or the RPS.

2. The system of claim 1, wherein the shelving unit further comprises a proximity sensor to enable the RPS to determine when the inventory item is proximate a front edge of the shelf.

3. The system of claim 1, wherein the locating system further comprises:
    a vertical track disposed vertically with respect to the one or more shelving units;
    a horizontal track disposed horizontally with respect to the one or more shelving units;

a vertical actuator to cause the RPS to traverse along the vertical track; and a horizontal actuator to cause the RPS to traverse along the horizontal track.

4. The system of claim 1, wherein end effector comprises a plurality of telescoping segments to adjust the width or the height of the end effector.

5. The system of claim 1, further comprising:
a vertical divider to divide a shelf of a shelving unit of the one or more shelving units into two bays; and
wherein the RPS is further responsive to the proximity sensor to substantially center the end effector in a bay of the two bays.

6. A robotic positioning system (RPS) comprising:
a vertical track disposed vertically with respect to a shelving unit; and
a control head including at least a vertical actuator to cause the RPS to traverse along the vertical track to position the RPS proximate to each of a plurality of shelves of the shelving unit;
an extender, coupled to the control head, to move between a retracted position and an extended position; and
an end effector, coupled to the extender, adjustable in at least one of width or height to interface with an inventory item;
a vertical divider to divide a shelf of the shelving unit into two or more bays;
a truck, the truck being either (1) a vertical truck comprising two or more alignment wheels to maintain an alignment of the vertical divider, wherein the two or more alignment wheels are sized and shaped to fit over an edge of the shelf, or (2) a horizontal truck comprising two or more alignment wheels to maintain an alignment of the vertical divider, wherein the two or more alignment wheels are sized and shaped to fit into a channel, the channel being disposed proximate to an edge of the shelf;
wherein the control head is configured to position the RPS behind the inventory item on the shelving unit;
wherein the extender is configured to move the inventory item from a first position to a second position; and
wherein the first position is closer to a rear portion of the shelving unit than the second position.

7. The RPS of claim 6, further comprising:
a horizontal track disposed horizontally with respect to the shelving unit; and
a horizontal actuator to cause the RPS to traverse along the horizontal track to position the RPS proximate to individual bays of a plurality of bays on a first shelf of the plurality of shelves.

8. The RPS of claim 6, wherein the control head further comprises:
a rotational actuator to rotate the vertical track to position the RPS axially with respect to the shelving unit.

9. The RPS of claim 6, wherein the truck comprises the vertical truck.

10. The RPS of claim 6, wherein the truck comprises the horizontal truck.

11. The RPS of claim 6, the end effector further comprising one or more imaging devices to detect one or more indicia disposed on a shelf of the shelving unit to position the RPS.

12. A method comprising:
receiving, at a robotic positioning system (RPS), location information from a management module of an inventory control system, the location information related to an inventory item;
activating a horizontal actuator to cause the RPS to traverse along a horizontal direction to a first location proximate to a shelving unit;
activating a vertical actuator of a control head of the RPS to cause the control head of the RPS to traverse along a vertical track in a vertical direction to a second location proximate to the shelving unit, wherein the second location coincides with the location information;
activating an extender coupled to the control head of the RPS to push the inventory item off of a shelf in the shelving unit and onto a conveyor system proximate to a front of the shelving unit.

13. The method of claim 12, wherein activating the extender of the RPS comprises moving the inventory item to a front edge of a shelf in the shelving unit.

14. The method of claim 12, further comprising:
adjusting a height of an end effector coupled to the extender from a first height to a second height;
wherein the second height comprises approximately a height of a shelf of the shelving unit at the second location.

15. The method of claim 12, wherein activating the extender of the RPS comprises pushing the inventory item onto the conveyor system.

16. The method of claim 12, wherein:
the location information comprises an indication of a bay in a shelving unit; and
the extender pushes the inventory item off of a shelf in the bay.

17. A robotic positioning system (RPS) comprising:
a vertical track disposed vertically with respect to a shelving unit; and
a control head including at least a vertical actuator to cause the RPS to traverse along the vertical track to position the RPS proximate to each of a plurality of shelves of the shelving unit;
an extender, coupled to the control head, to move between a retracted position and an extended position; and
an end effector, coupled to the extender, adjustable in both width and height, to interface with an inventory item, the end effector comprising horizontally extendible bars to adjust the width and vertically extendible bars to adjust the height;
one or more proximity sensors to enable the RPS to substantially center the end effector between at least one of (1) two vertical dividers on a shelf of the shelving unit or (2) two shelves of the shelving unit;
wherein the control head is configured to position the RPS behind the inventory item on the shelving unit;
wherein the extender is configured to move the end effector so that the end effector moves the inventory item from a first position to a second position; and
wherein the first position is closer to a rear portion of the shelving unit than the second position.

18. The RPS of claim 17, wherein the one or more proximity sensors enable the RPS to substantially center the end effector between the two vertical dividers.

19. The RPS of claim 17, wherein the one or more proximity sensors enable the RPS to substantially center the end effector between the two shelves.

20. The RPS of claim 17, further comprising:
a vertical divider to divide a shelf of the shelving unit into two bays; and
wherein the RPS is responsive to a proximity sensor of the one or more proximity sensors to determine a position of the inventory item in a bay of the two bays.

21. A method comprising:
- receiving, at a robotic positioning system (RPS), location information from a management module of an inventory control system, the location information related to an inventory item;
- activating a horizontal actuator to cause the RPS to traverse along a horizontal direction to a first location proximate to a shelving unit;
- activating a vertical actuator of a control head of the RPS to cause the control head of the RPS to traverse along a vertical track in a vertical direction to a second location proximate to the shelving unit, wherein the second location coincides with the location information;
- activating an extender coupled to the control head of the RPS to move the inventory item from a third location to a fourth location, wherein the third location is closer to a back of the shelving unit than the fourth location; and
- determining an approximate weight of the inventory item based at least in part on a current draw of an actuator associated with the extender when moving the inventory item from the third location to the fourth location.

* * * * *